United States Patent
Hiroshi

(10) Patent No.: US 10,225,333 B2
(45) Date of Patent: Mar. 5, 2019

(54) MANAGEMENT METHOD AND APPARATUS

(71) Applicant: FUJITSU LIMITED, Kawasaki-shi, Kanagawa (JP)

(72) Inventor: Masaya Hiroshi, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 491 days.

(21) Appl. No.: 14/530,961

(22) Filed: Nov. 3, 2014

(65) Prior Publication Data

US 2015/0134831 A1 May 14, 2015

(30) Foreign Application Priority Data

Nov. 13, 2013 (JP) .................................. 2013-234971

(51) Int. Cl.
*H04L 29/08* (2006.01)

(52) U.S. Cl.
CPC .............................. *H04L 67/1008* (2013.01)

(58) Field of Classification Search
CPC .................................................. H04L 67/1008
USPC ..................................................... 709/226
See application file for complete search history.

(56) References Cited

U.S. PATENT DOCUMENTS

| | | | | |
|---|---|---|---|---|
| 6,823,382 B2* | 11/2004 | Stone | ................... | G06F 11/0715 709/202 |
| 2005/0193113 A1 | 9/2005 | Kokusho et al. | | |
| 2006/0045039 A1* | 3/2006 | Tsuneya | ............... | H04L 41/0816 370/318 |
| 2009/0093966 A1 | 4/2009 | Ishii et al. | | |
| 2010/0106776 A1* | 4/2010 | Iwakura | ................... | H04L 41/00 709/203 |
| 2011/0154340 A1* | 6/2011 | Kanemasa | .......... | G06F 11/3495 718/100 |
| 2011/0167421 A1* | 7/2011 | Soundararajan | ...... | G06F 9/5077 718/1 |
| 2012/0254443 A1* | 10/2012 | Ueda | ................... | H04L 67/1008 709/226 |

(Continued)

FOREIGN PATENT DOCUMENTS

| | | |
|---|---|---|
| JP | 2006-268155 | 10/2006 |
| JP | 2006-322741 | 11/2006 |
| JP | 2007-82051 | 3/2007 |

(Continued)

*Primary Examiner* — Kevin T Bates
*Assistant Examiner* — Ronak Patel
(74) *Attorney, Agent, or Firm* — Fujitsu Patent Center

(57) ABSTRACT

Each time an information processing apparatus has executed a requested process, a compiling unit compiles, in a memory unit, a concurrent process count indicating the number of processes being executed by the apparatus at the start of the process in association with a processing time of the process. For each concurrent process count, a calculating unit calculates a representative value based on a subset out of a set of processing times associated with the concurrent process count. The subset is composed of processing times more than a representative value calculated based on a subset of processing times associated with a concurrent process count less than the concurrent process count. A determining unit determines need for an addition to resources based on a newly compiled processing time and a representative value of a concurrent process count associated with the newly compiled processing time.

13 Claims, 26 Drawing Sheets

AVERAGES CALCULATED
USING ALL RESPONSE TIMES

AVERAGES CALCULATED USING
ONLY RESPONSE TIMES OF
HIGH LOAD PROCESSES

(56) References Cited

U.S. PATENT DOCUMENTS

2015/0074679 A1* 3/2015 Fenoglio ............... G06F 9/505
                                                                                     718/104

FOREIGN PATENT DOCUMENTS

| | | |
|---|---|---|
| JP | 2010-33292 | 2/2010 |
| WO | 2004/092971 | 10/2004 |

* cited by examiner

141 RESPONSE TIME MANAGEMENT TABLE

| ID | REQUEST-DESTINATION VIRTUAL SERVER NAME | CONCURRENT REQUEST COUNT | REQUEST RESPONSE TIME |
|---|---|---|---|
| 1 | host1 | 1 | 11000 |
| 2 | host2 | 5 | 5300 |
| 3 | host1 | 3 | 4000 |
| 4 | host1 | 10 | 31000 |
| 5 | host1 | 3 | 14000 |
| 6 | host2 | 2 | 3000 |
| 7 | host1 | 3 | 12000 |

RESPONSE TIME AGGREGATE INFORMATION

142a AGGREGATE INFORMATION SET

| host1 | | | |
|---|---|---|---|
| CONCURRENT REQUEST COUNT | 1 | 3 | 10 |
| AGGREGATE DATA | 11000 | 13000 | 31000 |

142b AGGREGATE INFORMATION SET

| host2 | | | |
|---|---|---|---|
| CONCURRENT REQUEST COUNT | 2 | 5 | |
| AGGREGATE DATA | 3000 | 53000 | |

FIG. 15

143 COMMUNICATION TIME MANAGEMENT TABLE

| ID | REQUEST-DESTINATION VIRTUAL SERVER NAME | CONCURRENT REQUEST COUNT | COMMUNICATION-DESTINATION VIRTUAL SERVER NAME | COMMUNICATION TIME |
|----|---|---|---|---|
| 1 | host1 | 1 | host11 | 8100 |
| 2 | host2 | 5 | host21 | 3000 |
| 3 | host2 | 5 | host22 | 1500 |
| 4 | host1 | 10 | host11 | 16000 |
| 5 | host1 | 10 | host12 | 1000 |
| 6 | host1 | 3 | host11 | 9000 |
| 7 | host1 | 10 | host11 | 10000 |

COMMUNICATION TIME AGGREGATE INFORMATION

144a AGGREGATE INFORMATION SET

| host1⇒hoset11 | | | |
|---|---|---|---|
| CONCURRENT REQUEST COUNT | 1 | 3 | 10 |
| COMMUNICATION-TIME AGGREGATE DATA | 8100 | – | 13000 |

144b AGGREGATE INFORMATION SET

| host1⇒hoset12 | | | |
|---|---|---|---|
| CONCURRENT REQUEST COUNT | 10 | | |
| COMMUNICATION-TIME AGGREGATE DATA | 1000 | | |

144c AGGREGATE INFORMATION SET

| host2⇒hoset21 | | | |
|---|---|---|---|
| CONCURRENT REQUEST COUNT | 5 | | |
| COMMUNICATION-TIME AGGREGATE DATA | 3000 | | |

144d AGGREGATE INFORMATION SET

| host2⇒hoset22 | | | |
|---|---|---|---|
| CONCURRENT REQUEST COUNT | 5 | | |
| COMMUNICATION-TIME AGGREGATE DATA | 1500 | | |

FIG. 17

145 DELEGATION-DESTINATION MANAGEMENT TABLE

| DELEGATION ORDER | AUTO-SCALING DELEGATED LOAD BALANCER NAME |
|---|---|
| 1 | LB2 |
| 2 | ITSELF (LB1) |
| 3 | LB3 |
| 4 | LB2 |
| 5 | LB2 |
| 6 | LB2 |
| 7 | LB2 |

FIG. 18

MANAGEMENT METHOD AND APPARATUS

CROSS-REFERENCE TO RELATED APPLICATION

This application is based upon and claims the benefit of priority of the prior Japanese Patent Application No. 2013-234971, filed on Nov. 13, 2013, the entire contents of which are incorporated herein by reference.

FIELD

The embodiments discussed herein are related to a management method and a management apparatus for allocating resources according to workload.

BACKGROUND

An information processing system including a plurality of information processing apparatuses may employ a load balancer to distribute workload across the information processing apparatuses. The load distribution allows each of the information processing apparatuses to execute processes efficiently, resulting in an improvement in the processing performance of the information processing system as a whole.

In the case of implementing distributed processing across a plurality of information processing apparatuses, computer resources would be wastefully diverted, therefore decreasing the resource use efficiency, if too many information processing apparatuses are employed. On the other hand, if there are too few information processing apparatuses, too much load is put on each of the information processing apparatuses, resulting in prolonged response times to processing requests. In view of this, there has been proposed a technology for automatically increasing and decreasing the number of information processing apparatuses according to the amount of processes. This technology is referred to as auto scaling. As used herein, the terms 'scale-out' and 'scale-down' are taken to mean an increase and a decrease, respectively, in the number of information processing apparatuses. The implementation of auto scaling allows the information processing system as a whole to maintain sufficient performance while saving the computer resources.

The implementation of auto scaling is determined, for example, based on the central processing unit (CPU) utilization or threshold exceedance of a response time. There has also been proposed a technology for monitoring variations in the amount of requests received for each network service to thereby predict the amount of requests after a lapse of a predetermined time and then controlling amounts of the network service assigned to individual information processing apparatuses according to the predicted amount of requests.

International Publication Pamphlet No. WO 2004-092971

In the case where scale-out implementation is determined based on a response time, a scale-out action is performed, for example, when a process has occurred where the response time has exceeded a predetermined threshold. Increasing the number of information processing apparatuses for executing processes by the scale-out action is expected to reduce processing load of each information processing apparatus and decrease response times of the processes.

However, in fact, a scale-out action does not always produce a reduction in response times. For example, in the case where response times are delayed due to a failure in a system or communication congestion between information processing apparatuses in a multi-tier system, scaling out the information processing apparatuses has no effect on decreasing the response times. In addition, the prior art is not able to appropriately determine whether a scale-out action is effective when a response time has exceeded a predetermined threshold. As a result, when a response time has exceeded the threshold, a scale-out action is performed even though it is not possible to prevent response times of processes from exceeding the threshold, thus leading to a waste of resources.

SUMMARY

According to one embodiment, there is provided a non-transitory computer-readable storage medium storing therein a computer program that causes a management apparatus to perform a procedure. The management apparatus manages the amount of resources of one or more information processing apparatuses, to be allocated for execution of processes according to individual processing requests. The procedure includes compiling, in a memory, a concurrent process count and a processing time in association with each other in response to an execution of a process by one of the information processing apparatuses according to a received processing request, the concurrent process count indicating the number of processes being executed by the information processing apparatus at the start of the execution of the process, and the processing time spanning the start to completion of the execution of the process; calculating, with respect to each concurrent process count, a representative value based on a subset of processing times each associated with the concurrent process count, the subset being composed of processing times each more than a representative value calculated based on a subset of processing times associated with a concurrent process count less than the concurrent process count whose representative value is to be calculated; and determining the need for an addition to the resources based on a newly compiled processing time and a representative value of a concurrent process count associated with the newly compiled processing time.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 illustrates an example of a data structure of a response time management table;

FIG. 15 illustrates an example of a data structure of response time aggregate information;

FIG. 16 is an example of a data structure of a communication time management table;

FIG. 17 illustrates an example of a data structure of communication time aggregate information;

FIG. 18 illustrates an example of a data structure of a delegation-destination management table;

DESCRIPTION OF EMBODIMENTS

Figure 1:
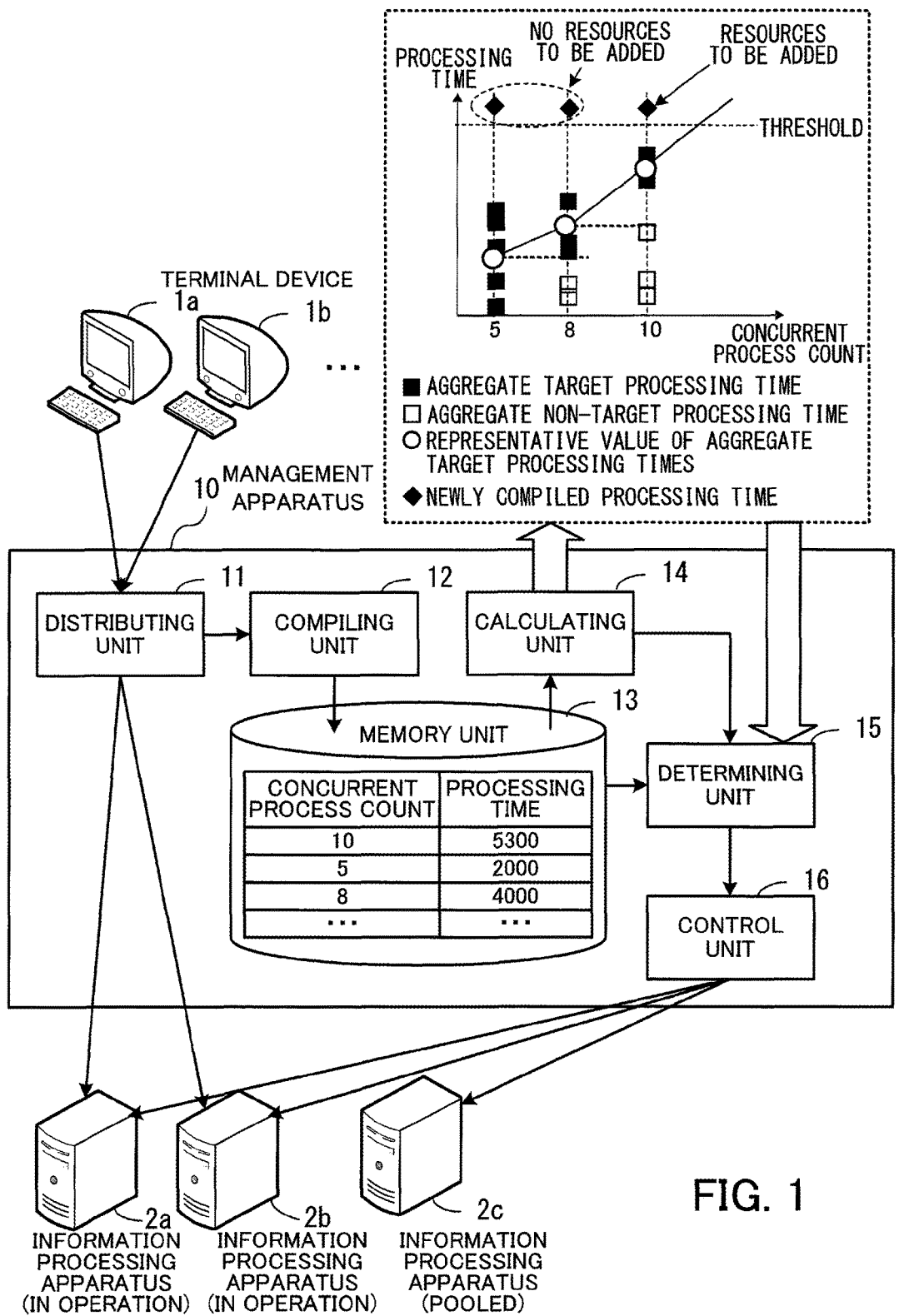
FIG. 1 illustrates an example of a system configuration according to a first embodiment.

Several embodiments will be described below with reference to the accompanying drawings, wherein like reference numerals refer to like elements throughout. Note that two or more of the embodiments below may be combined for implementation in such a way that no contradiction arises.

(a) First Embodiment

Next described is a first embodiment. The first embodiment is directed to an information processing system for not allocating additional resources even when a processing time spent to execute a process according to a processing request has exceeded a threshold if allocating additional resources is not effective to prevent processing times from exceeding the threshold.

FIG. 1 illustrates an example of a system configuration according to a first embodiment. A management apparatus 10 is connected to a plurality of terminal devices 1a, 1b, and so on and a plurality of information processing apparatuses 2a, 2b, and 2c. The terminal devices 1a, 1b, and so on issue processing requests for the information processing apparatuses 2a, 2b, and 2c. The processing requests are distributed across the information processing apparatuses 2a, 2b, and 2c via the management apparatus 10. Each of the information processing apparatuses 2a, 2b, and 2c executes a process according to each received processing request.

The information processing apparatus 2a/2b/2c allocates resources to execute the process corresponding to the processing request according to an instruction from the management apparatus 10. According to the example of FIG. 1, the information processing apparatuses 2a and 2b are currently in operation and the information processing apparatus 2c is not in operation (being pooled). In this case, resources of the information processing apparatuses 2a and 2b are allocated to execute the processes corresponding to the processing requests while resources of the information processing apparatus 2c are not.

The management apparatus 10 includes a distributing unit 11, a compiling unit 12, a memory unit 13, a calculating unit 14, a determining unit 15, and a control unit 16.

The distributing unit 11 distributes processing requests issued by the terminal devices 1a, 1b, and so on between the information processing apparatuses 2a and 2b in operation. For example, the distributing unit 11 distributes the processing requests in such a manner as that workload is distributed equally between the information processing apparatuses 2a and 2b.

Each time the information processing apparatus 2a/2b/2c has executed the process corresponding to each received processing request, the compiling unit 12 compiles information of the executed process in the memory unit 13. For example, for the executed process, a concurrent process count indicating the number of processes being executed by a corresponding information processing apparatus at the start of the execution of the process is stored in association with a processing time spanning the start to the completion of the process execution. In this regard, the compiling unit 12 may use, as the processing time, a period of time spanning transmission of the processing request to the information processing apparatus 2a/2b/2c to reception of a response to the processing request. In this case, however, the processing time includes a time spent for communication between the management apparatus 10 and the information processing apparatus 2a/2b/2c. In view of this, the information processing apparatus 2a/2b/2c may measure a processing time spent to execute a process according to a processing request, and the compiling unit 12 may acquire the measured processing time from the information processing apparatus 2a/2b/2c. Note that the concurrent process count is also referred to as processing multiplicity.

The memory unit 13 stores therein each concurrent process count in association with a processing time. According to the example of FIG. 1, the memory unit stores a concurrent process count and a processing time for each process, in association with an identifier (ID) of an information processing apparatus having executed the process.

With respect to each concurrent process count, the calculating unit 14 calculates a representative value of a subset out of a set of processing times each associated with the concurrent process count. The subset is composed of processing times each more than a representative value of a subset of processing times associated with a concurrent process count less than the concurrent process count the representative value of which is to be calculated. The calculating unit 14 may carry out the calculation of the representative value for each concurrent process count with respect to each information processing apparatus. The representative values are numerical values indicating characteristics and trends of processing times. For example, each representative value may be the average value or the median value of processing times included in a corresponding subset.

To calculate a representative value for a concurrent process count (for convenience, hereinafter referred to as the 'target concurrent process count'), the calculating unit 14 identifies, for example, the largest concurrent process count the representative value of which has been obtained amongst concurrent process counts less than the target concurrent process count. Then, the calculating unit 14 selects, amongst processing times associated with the target concurrent process count, processing times each more than the representative value of the identified concurrent process count, and then calculates the representative value of the target concurrent process count based on a subset composed of the selected processing times.

Based on a newly compiled processing time and a representative value obtained for a current process count associated with the processing time, the determining unit 15 determines the need for an addition to resources of information processing apparatuses, to be allocated for the execution of processes according to processing requests. For example, the determining unit 15 determines whether the following condition is satisfied: the newly compiled processing time is more than a predetermined threshold but less than a value obtained by multiplying a representative value of a concurrent process count associated with the processing time by a predetermined value. Here, the predetermined value used for the multiplication is a real number more than 1. The "value obtained by multiplying a representative value obtained for a concurrent process count associated with the processing time by a predetermined value" represents the upper limit of processing time under overload conditions, predicted based on previous processing history of high load processes each executed for the concurrent process count. That is, if the newly compiled processing time is more than the upper limit, it is determined that there is a cause other than work overload, such as a failure. Therefore, when the above-described condition is satisfied, the determining unit 15 determines to provide an addition to the resources of information processing apparatuses, to be allocated for the execution of processes according to processing requests.

According to the content of the determination made by the determining unit 15, the control unit 16 controls the amount of resources of the information processing apparatuses 2a, 2b, and 2c, to be allocated for the execution of processes according to processing requests. For example, when the determining unit 15 has determined to provide additional resources, the control unit 16 instructs the information processing apparatus 2c being pooled to start the execution of processes according to processing requests.

According to the management apparatus 10 having the above-described functional configuration, processing requests from the terminal devices 1a, 1b, and so on are distributed by the distributing unit 11 between the information processing apparatuses 2a and 2b in operation. Then, each of the information processing apparatuses 2a and 2b executes a process according to each distributed processing request. When completing the process, the information processing apparatus 2a/2b transmits a response to the processing request to the management apparatus 10. The distributing unit 11 receives the response from the information processing apparatus 2a/2b and then transfers the received response to a source terminal device of the processing request.

The compiling unit 12 monitors the distribution of processing requests and the transfer of responses to the processing requests implemented by the distributing unit 11. For example, in relation to the processing requests distributed to each of the information processing apparatuses 2a and 2b, the compiling unit 12 manages the number of processing requests the responses of which have not been received from the information processing apparatus 2a/2b, and defines the number of the outstanding processing requests as a concurrent process count of the information processing apparatus 2a/2b. In addition, the compiling unit 12 defines, for example, a period of time from the distribution of a processing request to the reception of a response to the processing request as a processing time of a process according to the processing request. When a response to a distributed processing request is returned, the compiling unit 12 stores, in the memory unit 13, a processing time of a process according to the processing request in association with a concurrent process count obtained at the start of the execution of the processing request.

Subsequently, the calculating unit 14 calculates a representative value for each concurrent process count based on information stored in the memory unit 13. In the calculation of a representative value for a target concurrent process count, for example, the largest concurrent process count the representative value of which has been obtained is identified amongst concurrent process counts less than the target concurrent process count. Then, amongst processing times each associated with the target concurrent process count, only processing times more than the representative value of the identified largest concurrent process count are selected as aggregate targets. The representative value of the target concurrent process count is obtained by aggregating the processing times of the aggregate targets. The representative value is, for example, the average of the processing times of the aggregate targets. Note that if no concurrent process count with a representative value is found in the concurrent process counts less than the target concurrent process count, for example, all processing times associated with the target concurrent process count are selected as aggregate targets.

According to the example of FIG. 1, processing times associated with concurrent process counts of 5, 8, and 10 are stored in the memory unit 13. In this case, to calculate a representative value for the concurrent process count of 5, which is the smallest concurrent process count among the above, all processing times associated with the concurrent process count of 5 are selected as aggregate targets. To calculate a representative value for the concurrent process count of 8, which is the second smallest concurrent process count, only processing times more than the representative value of the concurrent process count of 5 are selected amongst processing times associated with the concurrent processing count of 8 and used as aggregate targets. Similarly, to calculate a representative value for the concurrent process count of 10, only processing times more than the representative value of the concurrent process count of 8 are selected amongst processing times associated with the concurrent processing count of 10 and used as aggregate targets. The representative values of the individual concurrent process counts obtained in this manner are reported to the determining unit 15.

Then, when a new processing time is compiled in the memory unit 13, the determining unit 15 determines whether the processing time has exceeded a predetermined threshold. If the processing time has exceeded the threshold, the determining unit 15 compares the newly compiled processing time and the representative value of a concurrent process count associated with the newly compiled processing time, and then determines, based on the comparison result, the need for an addition to the resources of information processing apparatuses, to be allocated for the execution of processes according to processing requests.

For example, in the case where the newly compiled processing time is greater than or equal to a predetermined multiple (for example, two-fold) of the compared representative value, no additional resources are determined to be provided. That is, in the case where the processing time has exceeded the threshold but has gone substantially beyond the representative value, the lengthening of the processing time is likely to be attributed to a cause other than work overload, such as a failure. Providing additional resources, in such a case, to be allocated for the execution of processing requests results in wasteful consumption of the resources and does not reduce processing times. Therefore, it is appropriate not to add resources. In the example of FIG. 1, because a newly compiled processing time associated with the concurrent process count of 5 has exceeded the threshold but is more than or equal to the predetermined multiple of the representative value, no additional resources are determined to be provided. Much the same is true on a newly compiled processing time associated with the concurrent process count of 8 in FIG. 1.

On the other hand, in the case where the newly compiled processing time is less than the predetermined multiple of the compared representative value, additional resources are determined to be provided. That is, in the case where the processing time has exceeded the threshold and is not far off the representative value, the lengthening of the processing time is likely to be attributed to work overload. By providing additional resources, in such a case, to be allocated for the execution of processing requests, a reduction in processing times is expected. Therefore, it is appropriate to provide additional resources. In the example of FIG. 1, because a newly compiled processing time associated with the concurrent process count of 10 has exceeded the threshold and is less than the predetermined multiple of the representative value, additional resources are determined to be provided.

When additional resources are determined to be provided, the control unit 16 provides an addition to resources of the information processing apparatuses 2a, 2b, and 2c, to be allocated for the execution of processes according to processing requests. For example, newly launching the operation of the information processing apparatus 2c allows resources of the information processing apparatuses 2a, 2b, and 2c to be allocated for the execution of processes according to processing requests.

In the above-described manner, resource allocation of the information processing apparatuses 2a, 2b, and 2c for the execution of processes according to processing requests is appropriately implemented. That is, according to the first embodiment, to calculate a representative value of each concurrent process count, processing times equal to or less than a specified value are excluded from aggregate targets. This is done to exclude, from the aggregate targets, processes the processing times of which do not increase with increasing concurrent process count (for example, processes executed in very short times). As a result, each representative value is calculated based only on process times of processes, which increase when workload of the information processing apparatuses 2a and 2b in operation increases with increasing concurrent process count. The representative values for individual concurrent process counts obtained in this manner accurately represent the trend of increases in processing times with increasing concurrent process count. If a processing time has exceeded the threshold in a situation where processing times are increasing with increasing concurrent process count and many processing times are therefore approaching the threshold, the threshold exceedance of the processing time is considered to be attributed to work overload of the information processing apparatuses 2a and 2b in operation. In this case, by launching the operation of the pooled information processing apparatus 2c, it is possible to reduce processing times of processes according to subsequent processing requests.

On the other hand, in the case where a processing time has exceeded the threshold but the exceedance of the processing time is considered to be attributed to a cause other than work overload, additional resources are not provided. This prevents excessive consumption of resources and enables effective use of resources. In addition, the non-excessive use of resources reduces the power consumption of the system. Further, in the case of charging a user according to the usage of resources, it is possible to prevent the situation where the user has to face an increased charge even though processes were delayed due to a failure.

Note that in the case where no representative value has been calculated for a concurrent process count associated with the newly compiled processing time, the determining unit 15 may estimate the representative value for this target concurrent process count based on representative values calculated for different concurrent process counts. For example, the determining unit 15 identifies, amongst concurrent process counts for which representative values have been obtained, two concurrent process counts closest to the target concurrent process count, and then finds an expression representing the increase degree of representative values with increasing concurrent process count, based on the representative values of the two identified concurrent process counts. Then, using the expression, the determining unit 15 estimates the representative value of the concurrent process count associated with the newly compiled processing time. Herewith, an appropriate determination is made even when a newly compiled processing time associated with a concurrent process count, for which no representative value has been calculated, has exceeded the threshold.

In addition, the determining unit 15 determines to provide a reduction in the resources of information processing apparatuses, to be allocated for the execution of processes according to processing requests when all processing times compiled for the latest predetermined period of time are less than or equal to a predetermined value less than the threshold (for example, one-half of the threshold) used for the overload assessment. This prevents excessive consumption of resources.

In a computer system, it is sometimes the case that a plurality of information processing apparatuses deployed in a multi-tier configuration execute processes according to individual processing requests in cooperation with each other. In such a case, the management apparatus 10 of FIG. 1 may be deployed in each tier. The compiling unit 12 of each of the management apparatuses 10 compiles, for example, the following three information items in association with each other for each process executed according to a processing request received by a specific information processing apparatus among the plurality of information processing apparatuses: a concurrent process count; a processing time; and a communication time spent to communicate with a lower-tier information processing apparatus. As for the determination of the need for an addition to resources of information processing apparatuses, to be allocated for the execution of processes according to processing requests, the determining unit 15 adds the condition that the proportion of a communication time associated with a newly compiled processing time to the processing time is less than a predetermined value. This prevents each of the management apparatuses 10 from providing an addition to resources of information processing apparatuses managed by the management apparatus 10 although work overload is, in fact, occurring in a lower tier.

Note that if the proportion of the communication time associated with the newly compiled processing time to the processing time is more than or equal to the predetermined value, the determining unit 15 determines to provide an addition to resources of information processing apparatuses in a lower tier than the specific information processing apparatus. Upon making this determination, the determining unit 15 transmits a resource addition request to a different management apparatus managing the allocation of resources of lower-tier information processing apparatuses for the execution of processes according to processing requests. This enables an appropriate determination of the need for additional resources, in cooperation with the different management apparatus.

The management apparatus 10 in a multi-tier system performs the following processes upon receiving a resource addition request from a different management apparatus managing the allocation of resources of upper-tier information processing apparatuses for the execution of processes. For example, as for a process executed by an upper-tier information processing apparatus, the processing time of which has exceeded the threshold, a communication time spanning the start to the end of communication performed in the course of the execution of the process is obtained. Then, the obtained communication time is compared with a processing time of a process executed by a specific information processing apparatus according to a processing request sent through the communication. If the proportion of the processing time of the specific information processing apparatus in the lower tier to the communication time is more than or equal to a predetermined value, an addition to resources of information processing apparatuses, to be allocated for the execution of processes according to processing requests is determined to be provided. This prevents additional resources from being provided in the case of, not work overload of the lower-tier information processing apparatus, but communication overload.

Further, the determining unit 15 of the management apparatus 10 applied to a multi-tier system determines to provide a reduction in the resources of information processing apparatuses, to be allocated for the execution of processes according to processing requests in a certain case. The term 'certain case' here unit, for example, that newly compiled processing times are less than or equal to a predetermined value less than the threshold, and the management apparatus 10 did not transmit a resource addition request to a different management apparatus after determining to provide an addition to the resources of information processing apparatuses, to be allocated for the execution of processes according to processing requests. This allows the resources not to be reduced by more than the amount of added resources. As a result, it is possible to prevent excessive reduction of resources.

In addition, the determining unit 15 of the management apparatus 10 applied to a multi-tier system transmits a resource reduction request to a different management apparatus in a certain case. The term 'certain case' here unit, for example, that newly compiled processing times are less than or equal to a predetermined value less than the threshold, and the management apparatus 10 did not determine to provide an addition to the resources of information processing apparatuses, to be allocated for the execution of processes according to processing requests, after transmitting a resource addition request to the different management apparatus. Herewith, when processing times have decreased, resources of information processing apparatuses in an appropriate tier within the multi-tier system are reduced, thus promoting an effective use of resources.

In addition, the management apparatus 10 applied to a multi-tier system may receive a resource reduction request from a different management apparatus managing the allocation of resources of information processing apparatuses in a tier higher than a specific information processing apparatus, which resources are used for the execution of processes according to processing requests. In this case, the determining unit 15 of the management apparatus 10 determines to provide a reduction in resources of the specific information processing apparatus, to be allocated for the execution of processes according to processing requests, by not more than the amount of resources added in response to a resource addition request sent from the different management apparatus. This prevents excessive reduction of resources.

Note that the distributing unit 11, the compiling unit 12, the calculating unit 14, the determining unit 15 and the control unit 16 may be implemented, for example, by a processor of the management apparatus 10. In addition, the memory unit 13 may be implemented, for example, by memory of the management apparatus 10. In FIG. 1, each line connecting the individual components represents a part of communication paths, and communication paths other than those illustrated in FIG. 1 are also configurable.

(b) Second Embodiment

A second embodiment is described next. The second embodiment is directed to appropriately performing auto scaling in a multi-tier system.

In an information processing system, a process may not be completed by a single server, and it is often the case that a plurality of servers execute a process in cooperation with each other and then return a response. Therefore, a response time of an upper tier server may be delayed due to a prolonged response time of its lower tier server working together. In such a case, adding more servers by auto scaling may not improve the performance.

In view of this, the second embodiment measures, within the response time of an upper tier server to a request, a period spent for communicating with its lower tier server, to thereby determine whether the response delay is attributable to the upper tier server or the lower tier server. When the delay in the response time is understood to be attributable to a prolonged processing time of, not the upper tier server, but the lower tier server, the upper tier server promotes auto scaling of the communication-destination server in the lower tier, for example.

Note that servers in a multi-tier system are implemented, for example, by virtual servers. The virtual servers are computers (virtual machines) virtually provided in a physical server. For example, a physical server is able to host a number of virtual servers using hypervisor. Using the virtual servers facilitates server scale-out (i.e., addition of virtual servers) and server scale-down (reduction of virtual servers) by auto scaling. Therefore, according to the second embodiment, auto scaling is performed using virtual servers.

Figure 2:
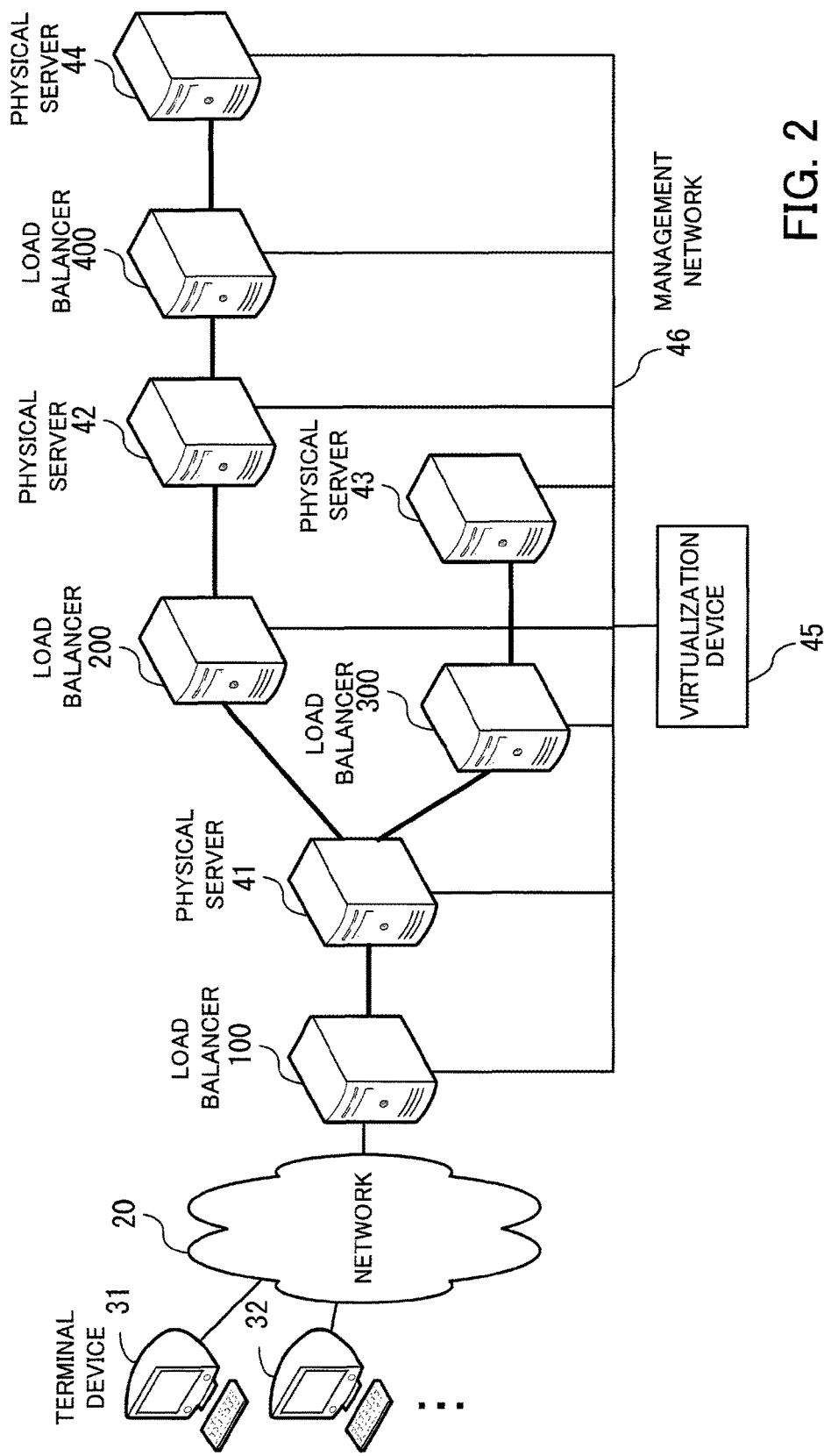
FIG. 2 illustrates an example of a system configuration according to a second embodiment.

FIG. 2 illustrates an example of a system configuration according to the second embodiment. A multi-tier system of FIG. 2 includes a plurality of load balancers 100, 200, 300, and 400 and a plurality of physical servers 41, 42, 43, and 44. Each of the load balancers 100, 200, 300, and 400 and the physical servers 41, 42, 43, and 44 is connected to a virtualization device 45 via a management network 46. The virtualization device 45 instructs the individual physical servers 41, 42, 43, and 44 to launch virtual servers and commence their operations. According to an instruction of the virtualization device 45, each of the physical servers 41, 42, 43, and 44 is able to launch a plurality of virtual servers.

Note that each virtual server provides a level of functionality needed for the execution of software, such as applications, by emulating behavior of a complete computer. Such a virtual server is implemented by a physical server allocating a part of hardware or software resources.

The load balancer 100 is connected to a plurality of terminal devices 31, 32, and so on via a network 20. The load balancer 100 is also connected to the physical server 41. Upon receiving requests to execute processes from the individual terminal devices 31, 32, and so on, the load balancer 100 transfers each of the requests to one of virtual servers running on the physical server 41. In this regard, the load balancer 100 determines the destination of each request in such a manner as that workload is distributed equally across the virtual servers on the physical server 41.

The load balancer 200 is connected between the physical servers 41 and 42. Upon receiving a request from the physical server 41, the load balancer 200 transfers the request to one of virtual servers running on the physical server 42. In this regard, the load balancer 200 determines the destination of the request in such a manner as that workload is distributed equally across the virtual servers on the physical server 42.

The load balancer 300 is connected between the physical servers 41 and 43. Upon receiving a request from the physical server 41, the load balancer 300 transfers the request to one of virtual servers running on the physical server 43. In this regard, the load balancer 300 determines the destination of the request in such a manner as that workload is distributed equally across the virtual servers on the physical server 43.

The load balancer 400 is connected between the physical servers 42 and 44. Upon receiving a request from the physical server 42, the load balancer 400 transfers the request to one of virtual servers running on the physical server 44. In this regard, the load balancer 400 determines the destination of the request in such a manner as that workload is distributed equally across the virtual servers on the physical server 44.

Each of the load balancers 100, 200, 300, and 400 is implemented, for example, by a computer having a processor and a memory.

Figure 3:
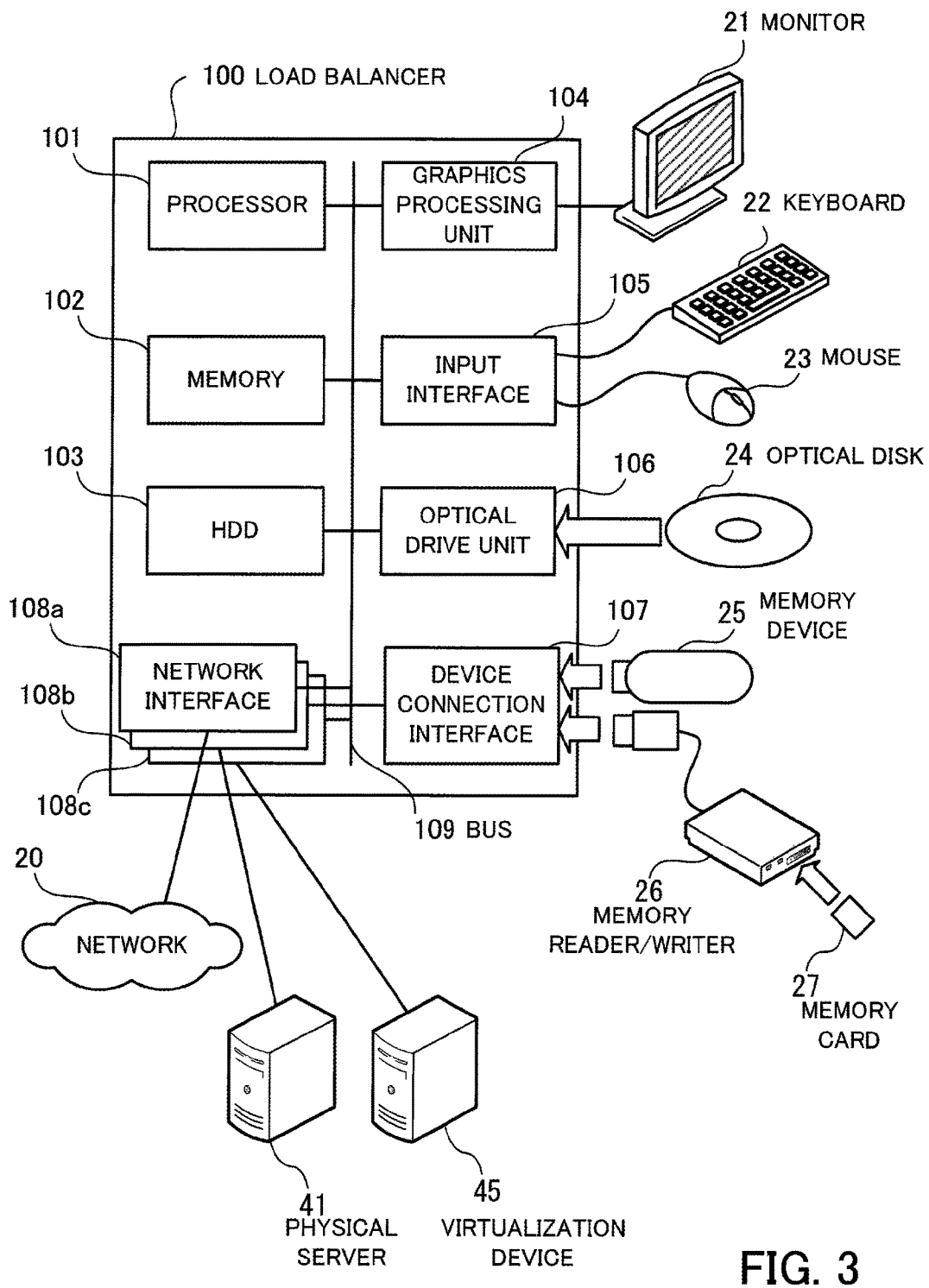
FIG. 3 illustrates an example of a hardware configuration of a load balancer.

FIG. 3 illustrates an example of a hardware configuration of a load balancer. Overall control of the load balancer 100 is exercised by a processor 101. To the processor 101, memory 102 and a plurality of peripherals are connected via a bus 109. The processor 101 may be a multi-processor. The processor 101 is, for example, a CPU, a micro processing unit (MPU), or a digital signal processor (DSP). At least part of the functions of the processor 101 may be implemented as an electronic circuit, such as an application specific integrated circuit (ASIC) and a programmable logic device (PLD).

The memory 102 is used as a main storage device of the load balancer 100. The memory 102 temporarily stores at least part of an operating system (OS) program and application programs to be executed by the processor 101. The memory 102 also stores therein various types of data to be used by the processor 101 for its processing. As the memory 102, a volatile semiconductor storage device such as a random access memory (RAM) may be used.

The peripherals connected to the bus 109 include a hard disk drive (HDD) 103, a graphics processing unit 104, an input interface 105, an optical drive unit 106, a device connection interface 107, and network interfaces 108*a*, 108*b*, and 108*c*.

The HDD 103 magnetically writes and reads data to and from a built-in disk, and is used as a secondary storage device of the load balancer 100. The HDD 103 stores therein the OS program, application programs, and various types of data. Note that a non-volatile semiconductor storage device such as a flash memory may be used as a secondary storage device in place of the HDD 103.

To the graphics processing unit 104, a monitor is connected. According to an instruction from the processor 101, the graphics processing unit 104 displays an image on a screen of the monitor 21. A cathode ray tube (CRT) display or a liquid crystal display, for example, may be used as the monitor 21.

To the input interface 105, a keyboard 22 and a mouse 23 are connected. The input interface 105 transmits signals sent from the keyboard 22 and the mouse 23 to the processor 101. Note that the mouse 23 is just an example of pointing devices, and a different pointing device such as a touch panel, a tablet, a touch-pad, and a track ball, may be used instead.

The optical drive unit 106 reads data recorded on an optical disk 24 using, for example, laser light. The optical disk 24 is a portable storage medium on which data is recorded in such a manner as to be read by reflection of light. Examples of the optical disk 24 include a digital versatile disc (DVD), a DVD-RAM, a compact disk read only memory (CD-ROM), a CD recordable (CD-R), and a CD-rewritable (CD-RW).

The device connection interface 107 is a communication interface for connecting peripherals to the load balancer 100. To the device connection interface 107, for example, a memory device 25 and a memory reader/writer 26 may be connected. The memory device 25 is a storage medium having a function for communicating with the device connection interface 107. The memory reader/writer 26 is a device for writing and reading data to and from a memory card 27 which is a card type storage medium.

The network interface 108*a* is connected to the network 20. Via the network 20, the network interface 108*a* transmits and receives data to and from the individual terminal devices 31, 32, and so on. The network interface 108*b* is connected to the physical server 41 so as to transmit and receive data to and from the physical server 41. The network interface 108*c* is connected to the virtualization device 45 so as to transmit and receive data to and from the virtualization device 45.

The hardware configuration described above achieves the processing functions of the second embodiment. Note that each of the remaining load balancers 200, 300, and 400, the virtualization device 45, the terminal devices 31, 32, and so on, and the physical servers 41, 42, 43, and 44 may be constructed with the same hardware configuration as the load balancer 100. In addition, the management apparatus 10 of the first embodiment may be constructed with the same hardware configuration as the load balancer 100 of FIG. 3.

The load balancer 100 achieves the processing functions of the second embodiment, for example, by executing a program stored in a computer-readable storage medium. The program describing processing contents to be implemented by the load balancer 100 may be stored in various types of storage media. For example, the program to be executed by the load balancer 100 may be stored in the HDD 103. The processor 101 loads at least part of the program stored in the HDD 103 into the memory 102 and then runs the program.

In addition, the program to be executed by the load balancer 100 may be stored in a portable storage medium, such as the optical disk 24, the memory device 25, and the memory card 27. The program stored in the portable storage medium becomes executable after being installed on the HDD 103, for example, under the control of the processor 101. Alternatively, the processor 101 may run the program by directly reading it from the portable storage medium.

Next described is a load distribution process implemented by virtual servers.

Figure 4:
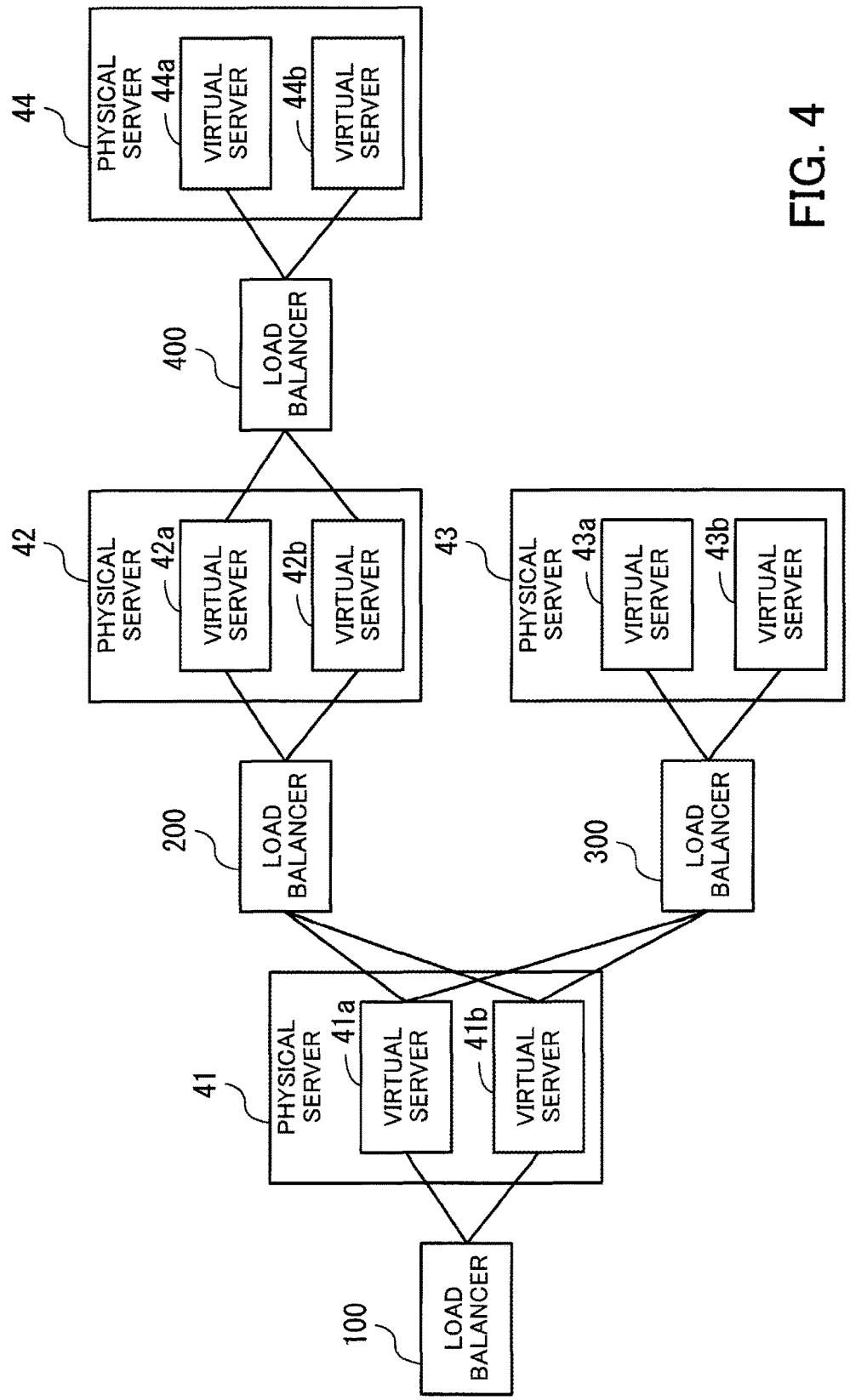
FIG. 4 illustrates an example of a load distribution process implemented by virtual servers.

FIG. 4 illustrates an example of a load distribution process implemented by virtual servers. The load balancer 100 transfers each of requests received from the individual terminal devices 31, 32, and so on to one of a plurality of virtual servers 41a and 41b running on the physical server 41 in such a manner as that workload is distributed equally between the virtual servers 41a and 41b. Each of the virtual servers 41a and 41b executes a process according to the received request. Then, when a process to be assigned to a different virtual server takes place during the execution of the process according to the received request, the virtual server 41a/41b generates a request for the process taking place and transmits the request to one of the load balancers 200 and 300. For example, if the process is to be assigned to one of the virtual servers 42a and 42b on the physical server 42, the request for the process is transmitted to the load balancer 200. On the other hand, if the process is to be assigned to one of the virtual servers 43a and 43b on the physical server 43, the request for the process is transmitted to the load balancer 300.

In the event that an upper tier virtual server transmits a request (a second request) to a load balancer in charge of distributing requests to lower tier virtual servers, the upper tier virtual server includes, in the second request to be transmitted, an identifier of a processing request (a first request) that the upper tier virtual server itself has received. After receiving the second request, the lower tier load balancer manages the received request using the attached identifier. This allows the first request executed by the upper tier virtual server to be uniquely associated with the second request directed to a lower tier virtual server, created during the execution of the first request.

The load balancer 200 transfers each of requests received from the individual virtual servers 41a and 41b to one of a plurality of virtual servers 42a and 42b running on the physical server 42 in such a manner as that workload is distributed equally between the virtual servers 42a and 42b. The load balancer 300 transfers each of requests received from the individual virtual servers 41a and 41b to one of a plurality of virtual servers 43a and 43b running on the physical server 43 in such a manner as that workload is distributed equally between the virtual servers 43a and 43b. Each of the virtual servers 42a, 42b, 43a, and 43b executes a process according to the received request. Then, when a process to be assigned to a different virtual server takes place during the execution of the process according to the received request, the virtual server 42a/42b generates a request for the new process and transmits the request to the load balancer 400. The load balancer 400 transfers each of requests received from the individual virtual servers 42a and 42b to one of a plurality of virtual servers 44a and 44b running on the physical server 44 in such a manner as that workload is distributed equally between the virtual servers 44a and 44b.

In the above-described manner, processes in each tier of the multi-tier system are distributed across virtual servers to thereby share processing load. The virtual servers 41a, 41b, 42a, 42b, 43a, 43b, 44a, and 44b are, for example, web servers, application servers, and database servers, and execute processes assigned to each tier. Note that in the example of FIG. 4, two virtual servers each 41a and 41b, 42a and 42b, 43a and 43b, and 44a and 44b are deployed on each of the physical servers 41, 42, 43, and 44, however, the number of virtual servers on each of the physical servers 41, 42, 43, and 44 is changed according to an instruction from the virtualization device 45.

Each of the load balancers 100, 200, 300, and 400 is in charge of determining the need for a scale-out or scale-down action by auto scaling, in addition to the load distribution processing. For example, each of the load balancers 100, 200, 300, and 400 monitors workload on its request-destination virtual servers, and then requests the virtualization device 45 to perform a scale-out action if the workload is too high.

Whether workload on virtual servers is too high is determined based on a response time to a request. That is, according to the second embodiment, the response time to a request is used as the processing time defined in the first embodiment. For example, the possibility of overload on virtual servers is determined, for example, when a request is detected where the response time has exceeded a threshold. However, even when the response time has exceeded the threshold, a request for a scale-out action is not made if the prolonged response time is attributable to a cause other than work overload. The cause of the prolonged response time is determined based on a response time to each request and a concurrent request count at a virtual server to which the request has been transmitted. The concurrent request count is the number of concurrent processes being executed by the request-destination virtual server at the start of the execution of a process corresponding to the transmitted request.

When the load balancer 100/200 determines that the prolonged response time is attributable to work overload, the load balancer 100/200 further determines whether the work overload is occurring at the request-destination virtual server or at a lower tier virtual server. Then, when determining that the work overload is located at a lower tier virtual server, the load balancer 100/200 delegates the determination of the need for auto scaling to a different load balancer in charge of distributing requests to the lower tier virtual server.

Each of the load balancers 100, 200, 300, and 400 makes appropriate determination not to carry out an unnecessary scale-out action. In other words, even when a response time to a request has exceeded the threshold, a scale-out action may not prevent response times of processes from exceeding the threshold. Performing a scale-out action in such a case decreases the resource use efficiency. A case is described next in detail where a scale-out action does not prevent response times of processes from exceeding a predetermined threshold even when a response time to a request has exceeded the threshold.

As a method to determine when to automatically add a server by auto scaling, a threshold for a response time to a request may be employed. That is, when the response time to a request exceeds the threshold (for example, one second), a scale-out action is performed. However, there are various causes for response time delays, and the response time may be prolonged due to a cause other than an overload of requests being made to a server. For example, the CPU utilization increases due to the occurrence of an infinite loop caused by an application failure, which may result in a prolonged response time. In addition, a failure causing the system to hang may delay a response time to a request. In such cases, the performance of the whole system may not be improved by a scale-out action to add more servers with the purpose of decreasing the number of processing requests per server.

It is considered that, in the case where a delay in a response time is attributable to a failure, the response time increases much more than usual. On the other hand, in the case where a delay in a response time is attributable to overload on a server, the response time of each request is considered to fall within a predetermined range from a response time predicted based on the number of requests being concurrently processed at the start of a process corresponding to the request (the concurrent request count). In view of this, even though a response time to a request has exceeded the threshold, it is considered appropriate not to perform a scale-out action if the exceedance of the response time is determined to be significant as compared to a response time predicted for the request.

Thus, in the case of determining whether to perform a scale-out action by comparing an actual response time with a predicted response time, it is important to appropriately predict the response time. In order to predict a request response time based on a concurrent request count, for example, the information processing system continuously collects a response time of each request and its concurrent request count, to thereby obtain the average response time across requests with the same concurrent request count. Further, the information processing system uses the average response time obtained for each concurrent request count as a predictive response time corresponding to the concurrent request count. Then, the information processing system compares a measured response time to a request, having exceeded the threshold, with the predictive response time corresponding to a concurrent request count obtained at the start of a process associated with the request. If the measured response time substantially exceeds the predictive response time, the information processing system does not perform a scale-out action. On the other hand, if the measured response time falls within a predetermined range from the predictive response time, the information processing system performs a scale-out action.

Figure 5:
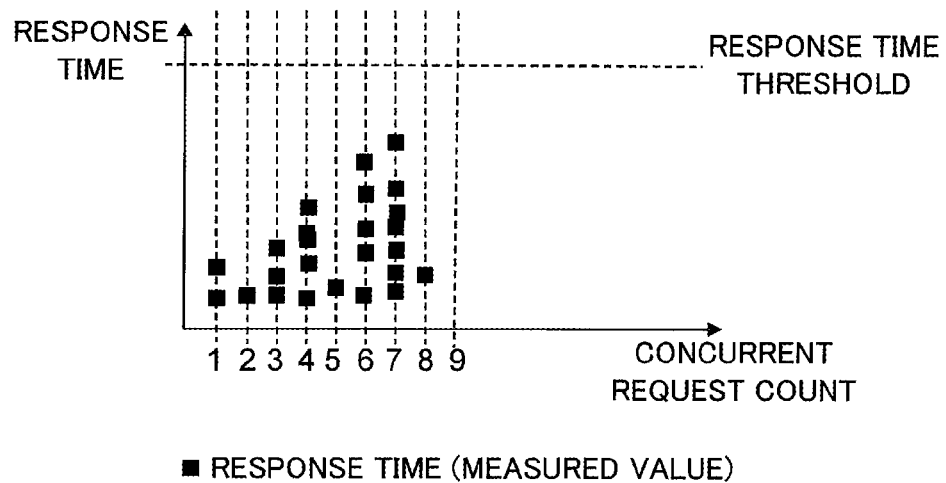
FIG. 5 illustrates a relationship between concurrent request counts and response times.

FIG. 5 illustrates a relationship between concurrent request counts and response times. In FIG. 5, the horizontal axis represents the concurrent request count and the vertical axis represents the response time. Each of the black rectangles in FIG. 5 indicates a measured response time and a corresponding concurrent request count associated with an executed request.

As seen in FIG. 5, requests with long response times increase in number with increasing concurrent request count. As for a request where the response time has exceeded a predetermined threshold, if the response time has significantly exceeded a reasonable response time range predicted when taking into account an increase or decrease in workload, it is determined that the response time has increased due to a cause other than work overload.

In the above-described manner, it is possible to determine whether to perform a scale-out action. However, this method has the following two problems. The first problem is that it is difficult to accurately predict a response time range taking into account an increase or decrease in workload if data collected to obtain the average response time is scarce. For example, in the case of a concurrent request count of 5 in FIG. 5, only one set of response time data has been collected for the concurrent request count. In the case of a concurrent request count of 9, no response time data has been collected for the concurrent request count, for example, due to a sudden increase in the number of requests. When no collected data, or only scarce data, exists as in the above cases, it is difficult to predict an appropriate response time range.

The second problem is that it is difficult to measure the average response time of requests for high load processes only. Requests handled by the information processing system include requests with short response times such as requests to simply display data, as well as requests with long response times such as requests to calculate a large quantity of data. An increase in the number of requests with short response times does not burden servers much, however, an increase in the number of requests with long response times imparts significant workload on the servers and the response times of the requests increase. Therefore, load balancing aims for the maintenance of performance by distributing requests needing long response times across a plurality of servers. Hence, in order to determine, for a request where the response time has exceeded the threshold, whether the lengthening of the response time is attributable to work overload or some failure, it is reasonable to calculate a predictive response time based on information of requests with long response times. Nonetheless, if the average response time is obtained for the collected data including requests with short response times and then used as a predictive response time, the predictive response time becomes smaller than the average response time calculated for the requests with long response times. Then, if the underestimated predictive response time is used in the comparison with the measured response time to determine the need for a scale-out action, the lengthening of the response time in fact caused by work overload may be mistakenly determined to be attributable to the occurrence of a failure, causing no scale-out action to take place.

Figure 6:
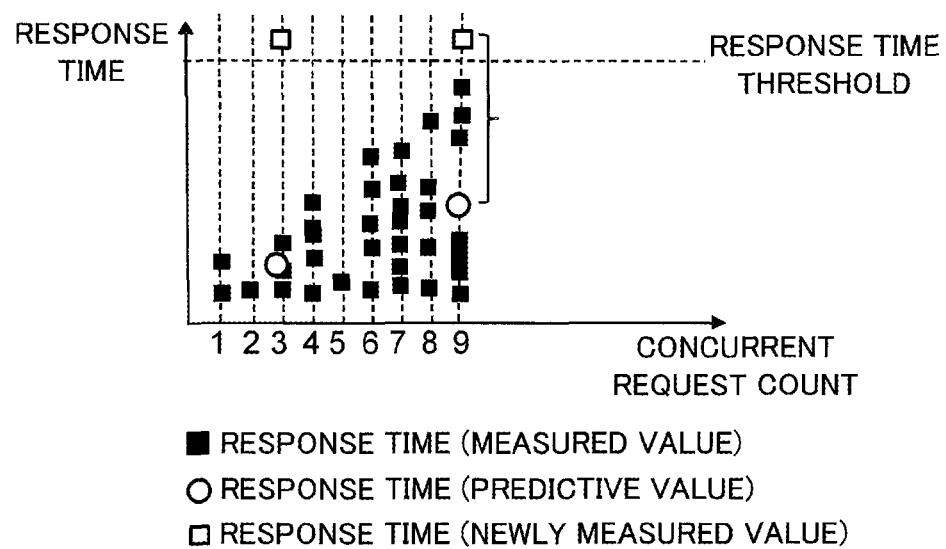
FIG. 6 illustrates an example of an erroneous determination of the need for a scale-out action.

FIG. 6 illustrates an example of an erroneous determination of the need for a scale-out action. In FIG. 6, the horizontal axis represents the concurrent request count and the vertical axis represents the response time. Each of the black rectangles in FIG. 6 indicates a measured response time and a corresponding concurrent request count associated with an executed request. In addition, each of the outlined rectangles indicates a response time and a concurrent request count associated with a newly executed request.

The example of FIG. 6 represents a case in which individual response times of newly executed requests with concurrent request counts of 3 and 9 have exceeded the threshold. The average response time for previously executed requests with the concurrent request count of 3 falls below one-half of the response time threshold. Therefore, as for the newly executed request with the concurrent request count of 3, the exceedance of the response time threshold is determined to be attributable to a failure, causing no scale-out action to take place. This is an appropriate determination.

The average response time for previously executed requests with the concurrent request count of 9 also falls below one-half of the response time threshold. Therefore, as for the newly executed request with the concurrent request count of 9, the exceedance of the response time threshold is determined to be attributable to a failure, causing no scale-out action to take place. However, as seen in FIG. 6, quite a few of the previously executed requests with the concurrent request count of 9 are located near the response time threshold. Therefore, it would be reasonable to determine in this case that the exceedance of the response time threshold is attributable to work overload, thus causing a scale-out action to take place. That is, using the average response time calculated based on all requests with the same concurrent request count as the predictive response time may result in an erroneous determination of the need for a scale-out action.

Note that processing content of each request varies depending on business applications for executing the process, and the applications are also subject to frequent changes. As a result, it is not realistic to determine the magnitude of workload to be involved in executing each request by analyzing the processing content of the request.

Auto scaling is effective for the case where response times of requests are reduced by deploying more servers to thereby reduce the concurrent request count executed by each server, in other words, the case where response times of requests increase as the concurrent request count increases and, therefore, the workload also increases. Graphically representing the relationship between concurrent request counts and request response times in such a case reveals the following attribute.

Attribute: Plotting the concurrent request count on the horizontal axis and the request response time on the vertical axis yields an upward sloping line, where the request response time increases with increasing concurrent request count.

Obtaining the slope of the upward sloping line allows differentiation of a request the response time of which has increased due to a failure or the like from a request the response time of which has increased due to work overload. As a result, a scale-out action is not performed when the response time has increased due to a cause other than work overload, thus preventing wasteful resource consumption.

In addition, a period spent for communicating with a different server within a response time of each request is measured. This allows a determination to be made of an increase in the response time being attributable to an increase in the processing time of, not an upper tier virtual server, but a lower tier virtual server. In this case, causing a lower tier where the communication-destination virtual server is located to be scaled out results in an appropriate scale-out action.

According to the second embodiment, the following processes are performed in order to appropriately determine the need for auto scaling: an aggregate data creation process; a scale-out need determination process; an auto scaling delegation process; and a scale-down determination process. These processes are described next in turn.

Aggregate Data Creation Process

In the aggregate data creation process, each of the load balancers 100, 200, 300, and 400 first compiles the following information with respect to each of all virtual servers for which the load balancer 100/200/300/400 is in charge of distributing workload.

response time of each request concurrent request count at the reception of each request name of a destination server and communication time in each case where an upper tier server communicated with a lower tier destination server Next, based on the compiled information, the load balancer 100/200/300/400 aggregates response times according to each concurrent request count, to thereby calculate aggregate data. In the calculation of the aggregate data, amongst response times compiled in association with each concurrent request count, response times equal to or below a predetermined level are excluded from aggregate targets.

Figure 7:
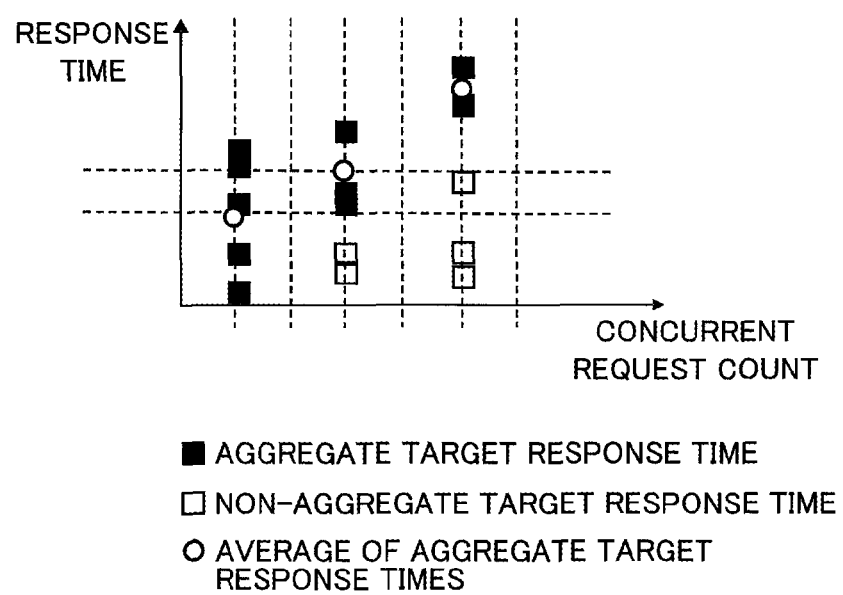
FIG. 7 illustrates an example of response times used to create aggregate data.

FIG. 7 illustrates an example of response times used to create aggregate data. The graph of FIG. 7 plots the concurrent request count on the horizontal axis against the response time on the vertical axis. Each of the rectangles in the graph represents a response time compiled in association with a concurrent request count.

In the calculation of the aggregate data for each concurrent request count, the load balancer 100/200/300/400 determines whether to use each of response times associated with the concurrent request count as an aggregate target, based on aggregate data calculated for a different concurrent request count.

For example, consider a case where there is no concurrent request count for which the average response time has already been obtained, amongst concurrent request counts less than the concurrent request count for which aggregate data is to be calculated (hereinafter referred to as the 'target concurrent request count'). The concurrent request counts less than the target concurrent request count are those located on the left side of the target concurrent request count in the graph. In this case, the load balancer 100/200/300/400 calculates the average of all response times associated with the target concurrent request count.

Consider another case where there is one or more concurrent request counts for each of which the average response time has already been obtained, amongst concurrent request counts less than the target concurrent request count. In this case, the load balancer 100/200/300/400 acquires the average response time of the largest concurrent request count amongst the concurrent request counts with the average response times. Here, the average response time of the largest concurrent request count unit the average response time of a concurrent request count located adjacent to and on the left side of the target concurrent request count in the graph. Subsequently, the load balancer 100/200/300/400 uses, amongst response times associated with the target concurrent request count, only response times exceeding the acquired average response time (of the different concurrent request count) as aggregate targets, and calculates the average response time of the aggregate targets.

The above-described procedure is carried out sequentially, for example, starting with the smallest concurrent request count. Then, the average response time calculated for each concurrent request count serves as the aggregate data.

Here is the reason to calculate the average response time of the target concurrent request count by using only response times exceeding the average response time of the concurrent request count located adjacent to and on the left side of the target concurrent request count in the graph. In a business system, individual servers handle both processes with low workload such as simple information reference, and processes with high workload such as file update, database update, and complex data calculation. Reference type processes involving low workload cause small increases in the response times with increasing concurrent request count. On the other hand, update type processes involving high workload cause significant increases in the response times with increasing concurrent request count. Therefore, such update type processes have an adverse impact on the response performance of the whole system.

In view of this, the load balancer 100/200/300/400 compares the response times of the target concurrent request count with the average response time of the concurrent request count located adjacent to and on the left side of the target concurrent request count in the graph. Then, assuming that processes with response times exceeding the average response time of the adjacent concurrent request count are high load processes, the load balancer 100/200/300/400 checks the trend of the response times of the high load processes. In this manner, it is possible to calculate the average response time of the target concurrent request count by using only response times of high load processes as aggregate targets.

Figure 8:
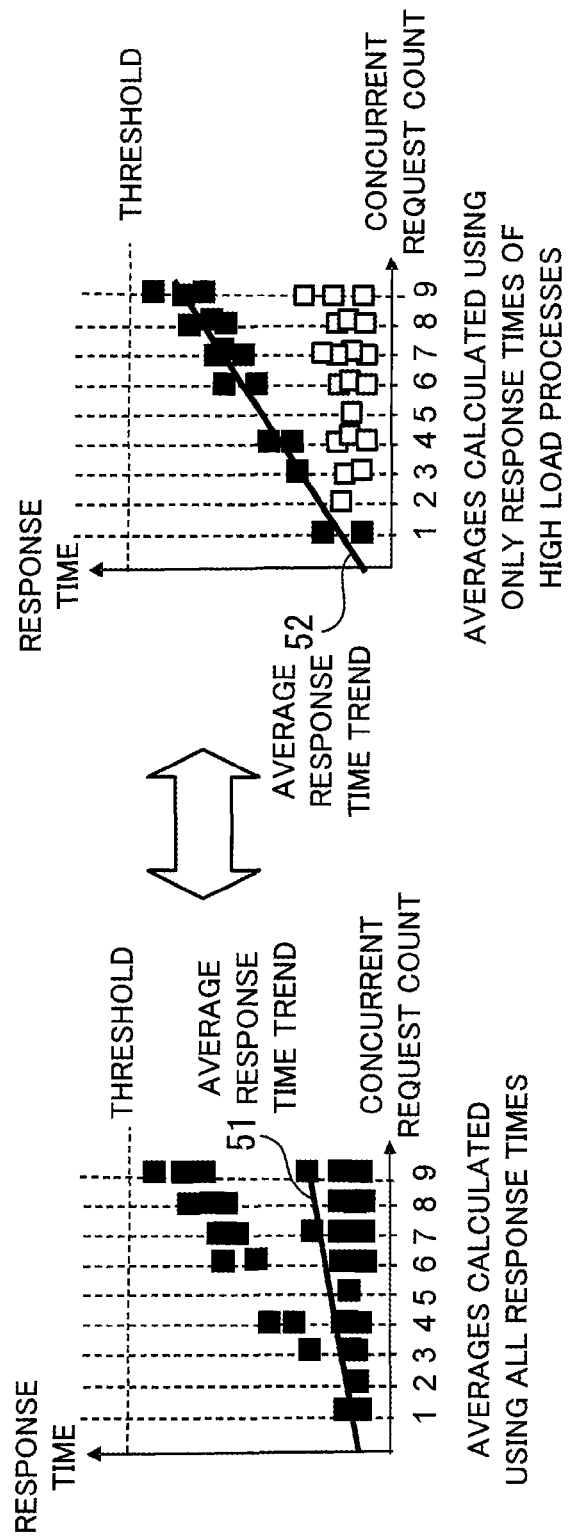
FIG. 8 illustrates a difference in average value trends due to differences in aggregate target response times.

Average response times individually calculated for each concurrent request count based on only response times of high load processes have a different trend from average response times individually calculated using all response times. FIG. 8 illustrates a difference in average response time trends due to differences in aggregate target response times. The left side of FIG. 8 represents an upward trend 51 of average response times with increasing concurrent request count when the average response times are calculated using all response times as the aggregate targets. On the other hand, the right side of FIG. 8 represents an upward trend 52 of average response times with increasing concurrent request count when the average response times are calculated using only response times of high load processes as the aggregate targets. As illustrated in FIG. 8, the case of calculating the average response times using only response times of high load processes displays a stronger upward trend of the average response times with increasing concurrent request count. That is, in this case, the line representing the average response times has a larger slope.

To take database update type processes and database reference type processes as an example, there are commonly a predominant number of requests for reference type processes. For example, in the case of personal information at social networking service (SNS) sites, the number of requests to refer to personal information is overwhelmingly more than that of requests to update personal information. Including such low workload, reference type processes to calculate the average response times leads to a misjudgment of the trend of high load processes for which a scale-out action is really needed, thus resulting in an erroneous determination of the need for auto scaling.

Scale-Out Need Determination Process

In the case where a response time of a request has exceeded the threshold, whether the lengthening of the response time is attributable to work overload on a virtual server is assessed based on the aggregate data obtained preliminarily, and the need for a scale-out action is then determined by the assessment result. That is, when the lengthening of the response time is determined to be attributable to a cause other than an increase in workload, no scale-out action is determined to take place. The assessment of whether the lengthening of the response time is attributable to work overload on a virtual server is made by comparing the response time having exceeded the threshold and the aggregate data of a concurrent request count associated with the response time. Note that the aggregate data is repeatedly calculated after a request response time exceeds the threshold, improving the reliability of the aggregate data.

Figure 9:
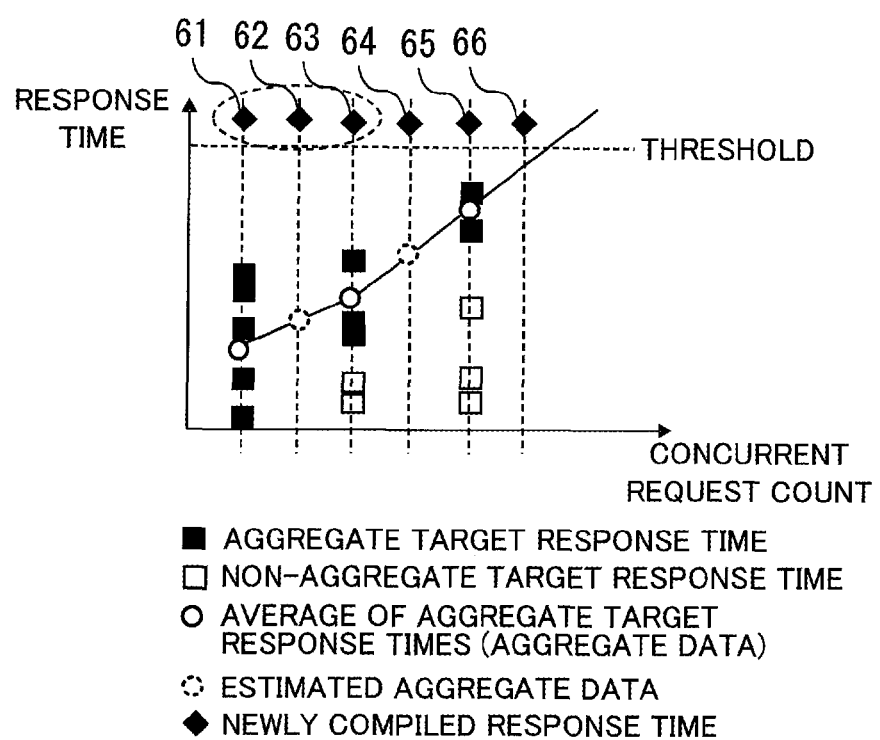
FIG. 9 is a graph illustrating examples of assessing the need for the scale-out action.

FIG. 9 is a graph illustrating examples of determining the need for a scale-out action. For example, in the case where aggregate data exists for a concurrent request count associated with a newly compiled response time, no scale-out action is determined to take place if the response time is twice or more than twice the aggregate data. According to the example of FIG. 9, if the newly compiled response time is either one of response times 61 and 63, no scale-out action is determined to take place. On the other hand, if a response time 65 is newly compiled, a scale-out action is determined to take place.

When no aggregate data exists for a concurrent request count associated with a newly compiled response time, it is determined whether aggregate data exists for a plurality of other concurrent request counts. If aggregate data exists for a plurality of other concurrent request counts, amongst the other concurrent request counts with the aggregate data, two concurrent request counts are identified which are located, in the graph, closest to the concurrent request count associated with the newly compiled response time. Subsequently, based on a linear expression passing through the aggregate data (average response times) of the identified concurrent request counts, an estimate value of aggregate data is calculated for the concurrent request count associated with the newly compiled response time. Then, if the newly compiled response time is twice or more than twice the estimate value, no scale-out action is determined to take place. According to the example of FIG. 9, if the newly compiled response time is either one of response times 62 and 64, aggregate data for a concurrent request count associated with the response time 62/64 is estimated based on aggregate data of concurrent request counts located, in the graph, on each side of the concurrent request count associated with the response time 62/64. On the other hand, if the newly compiled response time is a response time 66, aggregate data for a concurrent request count associated with the response time 66 is estimated based on aggregate data of two concurrent request counts located, in the graph, on the immediate left side of the concurrent request count associated with the response time 66. In the case of the response time 62, no scale-out action is determined to take place. On the other hand, in the case of the response times 64 and 66, a scale-out action is determined to take place.

Note that calculating the average of only response times exceeding the average response time of a concurrent request count located adjacent to and on the left side in the graph may lead to representing an overly strong upward trend of the aggregate data with increasing concurrent request count. In such a case, as the concurrent request count increases, a concurrent request count arises for which no response times to be aggregate targets exist. As a result, the upward trend of the aggregate data with increasing concurrent request count is adjusted to fall within an appropriate range.

Figure 10:
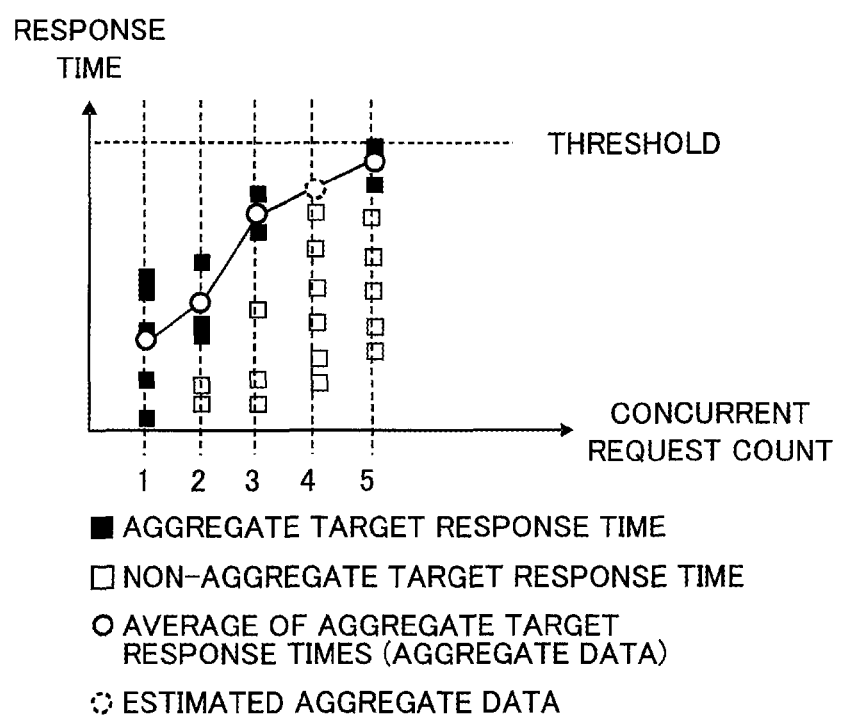
FIG. 10 illustrates an example where an upward trend in values of the aggregate data with increasing concurrent request count is adjusted.

FIG. 10 illustrates an example where an upward trend in values of aggregate data with increasing concurrent request count is adjusted. As illustrated in FIG. 10, the aggregate data greatly increases from a concurrent request count of 2 to a concurrent request count of 3. In this case, a concurrent request count of 4 has no associated response times to be aggregate targets, and thus the average response time is not obtained for the concurrent request count of 4. As a result, in calculating aggregate data for a concurrent request count of 5, response times exceeding the aggregate data of the concurrent request count of 3 are used as aggregate targets.

Aggregate data of the concurrent request count of 4 is estimated from the aggregate data of the concurrent request counts of 3 and 5. That is, a response time where a straight line (linear expression) passing through the aggregate data of the concurrent request counts of 3 and 5 intersects, in the graph, the concurrent request count of 4 is an estimate value of aggregate data for the concurrent request count of 4. In this case, because the concurrent request count is increased by two from 3 to 5, the slope of the obtained linear expression is correspondingly controlled.

As described above, even if a value of the aggregate data becomes too large for a concurrent request count due to the lack of data samples, the slope of the average response times is controlled when a concurrent request count located adjacent to and on the right side in the graph has fewer response times to be aggregate targets. As a result, it is possible to obtain a trend sufficient to exclude outliers.

Auto Scaling Delegation Process

When a request response time is determined to have exceeded the threshold due to an increase in workload, a period spent for communicating with a different virtual server (hereinafter referred to as "communication time"), which period has been collected with the request response time, is compared with the request response time. If the communication time accounts for 50% or more of the entire request response time, a load balancer delegates auto scaling to a different load balancer in charge of distributing requests to the different virtual server (i.e., the virtual server which communicated with a virtual server having executed a process the response time of which has exceeded the threshold). Otherwise, the load balancer performs a scale-out action for the virtual server having executed the process the response time of which has exceeded the threshold.

The different load balancer to which auto scaling has been delegated analyzes the concurrent request count, the response time, and the communication time spent for communication with the different virtual server, and then determines the need for a scale-out action. For example, the auto-scaling delegated load balancer denotes, as X (positive real number), the communication time spent by the upper tier virtual server during executing, under the delegation-source load balancer, a process the request response time of which has exceeded the threshold. In addition, the auto-scaling delegated load balancer denotes, as Y (positive real number), a response time to a request transmitted to the lower tier virtual server through communication with the upper tier virtual server. The auto-scaling delegated load balancer determines whether Y accounts for 80% or more of X. If Y does not account for 80% or more of X, the auto-scaling delegated load balancer determines not to perform a scale-out action.

The above determination as to whether Y accounts for 80% or more of X is made because network communication may be acting as a bottleneck for communication between the upper and lower tier virtual servers. When the network communication is taking a long time, the performance is not improved by adding more servers. Therefore, if Y does not account for 80% or more of X, no scale-out action is determined to take place.

When Y accounts for 80% or more of X, the auto-scaling delegated load balancer compares the response time Y with a period spent by the lower tier virtual server to communicate with a different virtual server ("communication time") during the execution of a process corresponding to the response time Y. If the communication time accounts for 50% of the response time Y, the auto-scaling delegated load balancer further delegates auto scaling to a different load balancer in charge of distributing requests to the different virtual server (i.e., the communication-destination virtual server). If not, the auto-scaling delegated load balancer determines to perform a scale-out action by auto scaling.

Figure 11:
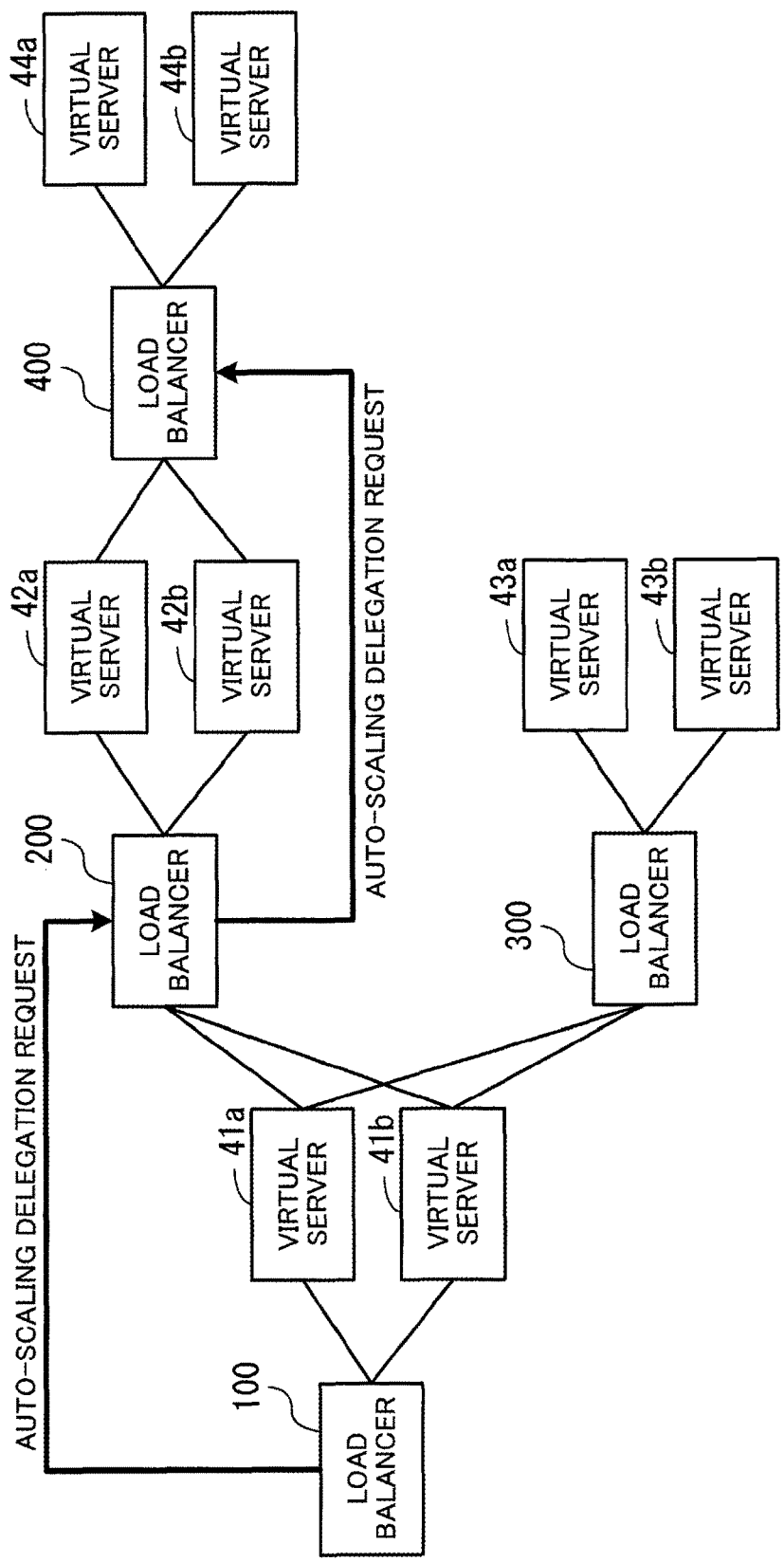
FIG. 11 illustrates an example of auto scaling delegation.

As long as communication with a lower tier virtual server has taken place, individual load balancers in charge of distributing requests in each tier repeatedly determine whether to perform or delegate auto scaling. FIG. 11 illustrates an example of auto scaling delegation. According to the example of FIG. 11, an auto-scaling delegation request is transmitted from the load balancer 100 in charge of distributing requests between the first tier virtual servers 41a and 41b to the load balancer 200 in charge of distributing requests between the second tier virtual servers 42a and 42b. Further, another auto-scaling delegation request is transmitted from the load balancer 200 to the load balancer 400 in charge of distributing requests between the third tier virtual servers 44a and 44b.

In the above-described manner, a determination of whether to perform or delegate auto scaling is made sequentially from an upper tier to a lower tier, to thereby identify a virtual server causing a delay in the response time, and it is thus possible to perform a scale-out action for the identified virtual server. Note that a load balancer to which auto scaling has been delegated is able to recognize, through the fact of auto scaling having been delegated to the load balancer even if the response time compiled by the load balancer itself does not exceed the threshold, that a bottleneck causing a delay in the response time of an upper tier virtual server is present in a tier below the load balancer. As a result, it is possible to improve the performance of the system as a whole by quickly resolving the response time delay.

Scale-Down Determination Process

Each of the load balancers 100, 200, 300, and 400 determines to perform a scale-down action when response times have continued to be sufficiently short over a long period of time. For example, after such a situation continues for 30 minutes, the load balancer 100/200/300/400 determines that the situation has continued over a long period of time. In addition, one-half of the response time threshold may be considered as being "sufficiently short". Note that a system administrator is able to accordingly change the lengths of time individually set for the above "long period of time" and "response times to be sufficiently short".

Note that, even when a load balancer determines that request response times of virtual servers for which the load balancer is in charge have been sufficiently short, a scale-down action may cause an increase in response times of an upper tier virtual server if auto scaling has been delegated to the load balancer. In view of this, the need for a scale-down action is determined in the following manner.

Auto Scaling Delegation Source Involved in Scale-Out Action

When delegating auto scaling involving a scale-out action, each of the load balancers 100, 200, 300, and 400 stores host names of auto-scaling delegated load balancers and the order of delegation. In addition, when the load balancer 100/200/300/400 itself performs auto scaling involving a scale-out action, the load balancer 100/200/300/400 stores the point in time of the scale-out action in association with the order of delegation. For example, the following information is stored: delegation to load balancer 1>delegation to load balancer 2>its own scale-out action>delegation to load balancer 1>delegation to load balancer 3.

When determining that response times have continued to be sufficiently short over a long period of time, the load balancer 100/200/300/400 instructs auto scaling involving a scale-down action in the reverse order of the delegation of auto scaling for a scale-out action. According to the above example, instructions for a scale-down action are issued in the following order: load balancer 3>load balancer 1>its own scale-down action>load balancer 2>load balancer 1.

Auto Scaling Delegation Destination Involved in Scale-Out Action

When performing a scale-out action upon delegation of auto scaling, each of the load balancers 100, 200, 300, and 400 tallies the number of added virtual servers. On the other hand, when performing a scale-down action in response to an instruction from a delegation source, the load balancer 100/200/300/400 subtracts the number of reduced virtual servers from the number of added virtual servers. Even when determining that request response times have been sufficiently short, the load balancer 100/200/300/400 determines not to perform a scale-down action if the number of virtual servers added by auto scaling delegation is 1 or more, but determines to perform a scale-down action when the number of virtual servers added by auto scaling delegation is 0. In addition, in the case where auto scaling for a scale-down action is delegated from a delegation source, the load balancer 100/200/300/400 determines to perform a scale-down action if a scale-out action has taken place previously in response to an auto-scaling delegation request for a scale-out action issued from the delegation source. In this manner, it is possible to prevent each of the plurality of load balancers in the multi-tier system from performing a scale-down action excessively to thereby extend the response time of the system as a whole.

Figure 12:
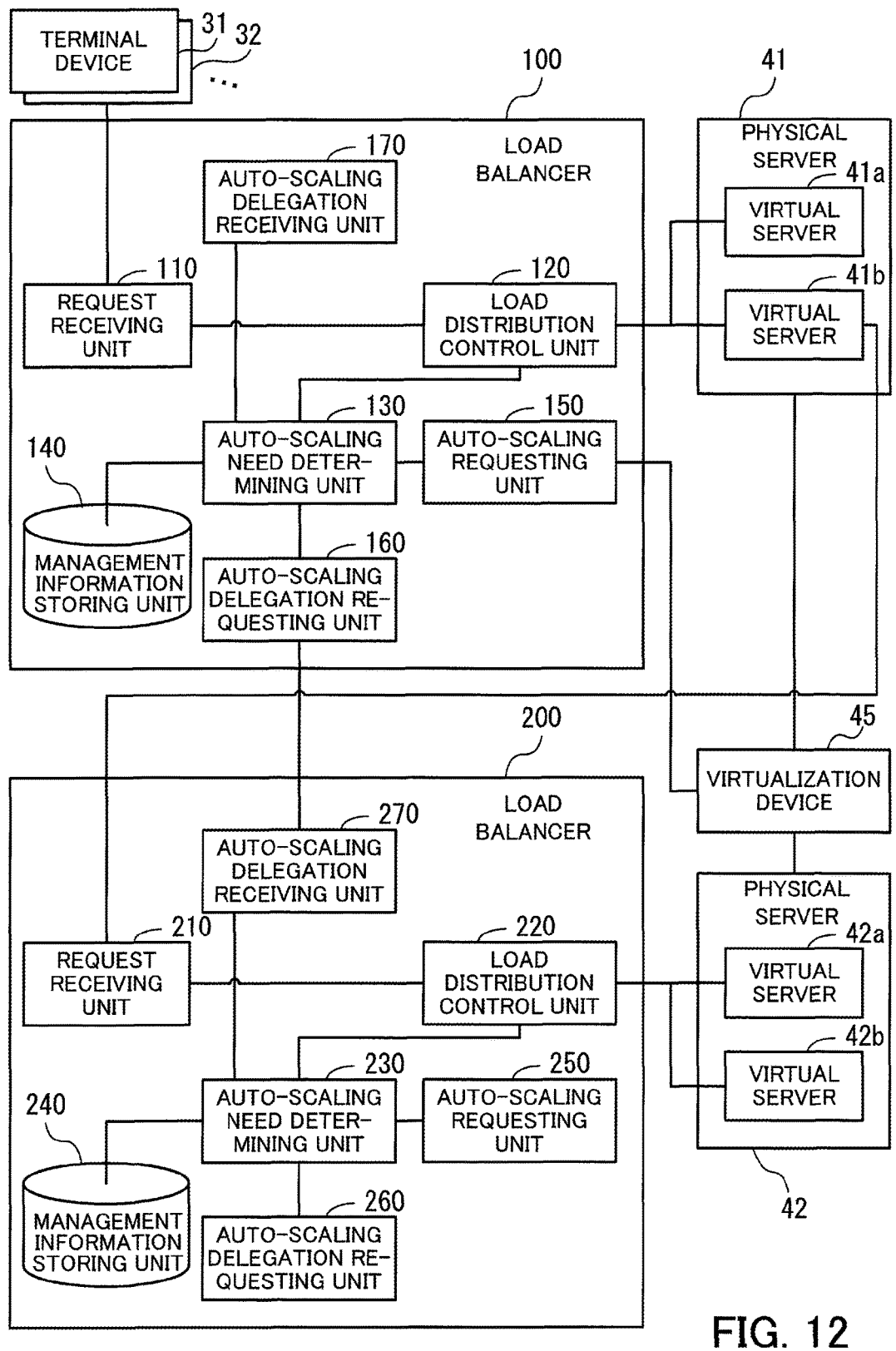
FIG. 12 is a block diagram illustrating an example of functional configurations of load balancers.

Functions of load balancers of the second embodiment are described next in detail. FIG. 12 is a block diagram illustrating an example of functional configurations of load balancers. The load balancers 100 and 200 individually include each of the following functional components: request receiving units 110 and 210; load distribution control units 120 and 220; auto-scaling need determining units 130 and 230; management information storing units 140 and 240; auto-scaling requesting units 150 and 250; auto-scaling delegation requesting units 160 and 260; and auto-scaling delegation receiving units 170 and 270.

The request receiving unit 110/210 receives processing requests from outside sources. For example, the request receiving unit 110 of the load balancer 100 receives requests sent from terminal devices 31, 32, and so on. The request receiving unit 210 of the load balancer 200 receives requests sent from the virtual servers 41*a* and 41*b* running on the physical server 41. The request receiving unit 110/210 transmits the received requests to the load distribution control unit 120/220. Upon receiving a response to a request from the load distribution control unit 120/220, the request receiving unit 110/210 sends the received response to a request source.

Upon receiving a request, the load distribution control unit 120/220 transfers the request to a virtual server. In this relation, if there are a plurality of destination virtual servers, the load distribution control unit 120/220 determines a destination of the request in such a manner as that workload is distributed equally across the virtual servers. In addition, upon receiving a response to the request from the destination virtual server, the load distribution control unit 120/220 transfers the received response to the request receiving unit 110/210.

Further, when receiving the response to the request from the destination virtual server, the load distribution control unit 120/220 obtains a response time and a concurrent request count associated with the request. The response time is an elapsed time from the transmission of the request to the reception of the response. For example, when transmitting a request to a virtual server, the load distribution control unit 120/220 stores the transmission time in association with an identifier of the request. Subsequently, when receiving a response, the load distribution control unit 120/220 determines the transmission time of a corresponding request based on a request identifier attached to the content of the response, and obtains the response time of the request by calculating an elapsed time from the transmission time to the reception time of the response.

The concurrent request count is the number of requests being processed by a request-destination virtual server at the reception of a request. In other words, the concurrent request count is the number of requests for which responses from the virtual server have not been received amongst requests having been transmitted to the virtual server from the load distribution control unit 120/220. For example, with respect to each virtual server, the load distribution control unit 120/220 counts the number of requests transmitted to the virtual server, for which responses have yet to be received (the concurrent request count). Then, when transmitting a new request to the virtual server, the load distribution control unit 120/220 sets, as the concurrent request count of the new request obtained at the start of the execution, a value obtained by adding 1 to the concurrent request count of the virtual server prior to the transmission of the new request.

The load distribution control unit 120/220 stores, in memory, the concurrent request count obtained at the start of the execution of the transmitted request in association with the identifier of the request, for example. Upon receiving a response to the request, the load distribution control unit 120/220 transmits a pair of the concurrent request count associated with the identifier of the request and the response time to the auto-scaling need determining unit 130/230.

In the case where a virtual server to which the load distribution control unit 120/220 has transmitted a request ("first request") transmits a new request ("second request") to a lower tier virtual server in the course of a process corresponding to the first request, the load distribution control unit 120/220 acquires a communication time spent for communication with the lower tier virtual server. For example, upon receiving a response to the first request from the virtual server, the load distribution control unit 120/220 acquires, from the virtual server, a period of time from the transmission of the second request to the lower tier virtual server in the course of the process corresponding to the first request to the reception of a response to the second request. Subsequently, the load distribution control unit 120/220 transmits, as the communication time, the acquired period of time in association with an identifier of the first request to the auto-scaling need determining unit 130/230.

The auto-scaling need determining unit 130/230 determines whether to perform auto scaling. For example, using the management information storing unit 140/240, the auto-scaling need determining unit 130/230 manages paired concurrent request count and response time for each executed request, received from the load distribution control unit 120/220. Then, each time the load distribution control unit 120/220 receives a response to a request, the auto-scaling need determining unit 130/230 determines the need for auto scaling based on information stored in the management information storing unit 140/240. In addition, when acquiring an auto-scaling delegation request from a different load balancer via the auto-scaling delegation receiving unit 170/270, the auto-scaling need determining unit 130/230 also determines the need for auto scaling.

In the determination of the need for auto scaling made by each of the load balancers 100 and 200, a determination is made of whether to implement auto scaling for a virtual server group across which requests are distributed by the load balancer 100/200. For example, the auto-scaling need determining unit 130 determines whether to increase or decrease the number of virtual servers 41*a* and 41*b* between which requests are distributed by the load distribution control unit 120. Similarly, the auto-scaling need determining unit 230 determines whether to increase or decrease the number of virtual servers 42*a* and 42*b* between which requests are distributed by the load distribution control unit 220. When determining to implement auto scaling, the auto-scaling need determining unit 130/230 requests the auto-scaling requesting unit 150/250 to transmit an auto-scaling request.

In addition, the auto-scaling need determining unit 130/230 also determines the need for implementing auto scaling for a virtual server group in a lower tier than the virtual server group across which requests are distributed by the load balancer 100/200. When determining to implement auto scaling for the lower-tier virtual server group, the auto-scaling need determining unit 130/230 requests the auto-scaling delegation requesting unit 160/260 to transmit an auto-scaling delegation request.

The management information storing unit 140/240 stores therein information used to determine the need for auto scaling. For example, the management information storing unit 140/240 stores concurrent request counts and response times associated with individual requests, and aggregate data created based on the associated concurrent request counts and response times. In addition, the management information storing unit 140/240 also stores, for example, communication times for individual requests and aggregate data of the communication times. A part of the storage area of memory or a HDD of the load balancer 100/200, for example, is used as the management information storing unit 140/240. Note that the information stored in the management information storing unit 140/240 is described later in detail (see FIGS. 13 to 19).

In response to a request from the auto-scaling need determining unit 130/230, the auto-scaling requesting unit 150/250 transmits an auto-scaling request to the virtualization device 45. The auto-scaling request includes information, for example, about on which physical server the virtual servers subject to auto scaling are running and which one of a scale-out action and a scale-down action is to be performed.

In response to a request from the auto-scaling need determining unit 130/230, the auto-scaling delegation requesting unit 160/260 transmits an auto-scaling delegation request to a load balancer in charge of distributing requests to lower tier virtual servers.

The auto-scaling delegation receiving unit 170/270 receives an auto-scaling delegation request from a different load balancer. Then, the auto-scaling delegation receiving unit 170/270 transmits the received auto-scaling delegation request to the auto-scaling need determining unit 130/230.

The load balancers 100 and 200 having the above-described functional configurations are able to implement appropriate auto scaling for the whole multi-tier system. Note that the remaining load balancers 300 and 400, which are not illustrated in FIG. 12, also have the same functional configurations as the load balancers 100 and 200. In FIG. 12, each line connecting the individual components represents a part of communication paths, and communication paths other than those illustrated in FIG. 12 are also configurable. Further, the function of each component illustrated in FIG. 12 is implemented, for example, by causing a computer to execute a program module corresponding to the component.

The relationship between the functions of the management apparatus 10 of the first embodiment of FIG. 1 and those of the load balancers 100 and 200 of the second embodiment of FIG. 12 is as follows. The function of the distributing unit 11 of the management apparatus 10 is implemented by the request receiving units 110 and 210 and the load distribution control units 120 and 220 of the load balancers 100 and 200. The functions of the compiling unit 12, calculating unit 14, and determining unit 15 of the management apparatus 10 are implemented by the auto-scaling need determining units 130 and 230 of the load balancers 100 and 200. The memory unit 13 of the management apparatus 10 is implemented by the management information storing units 140 and 240 of the load balancers 100 and 200.

Figure 13:
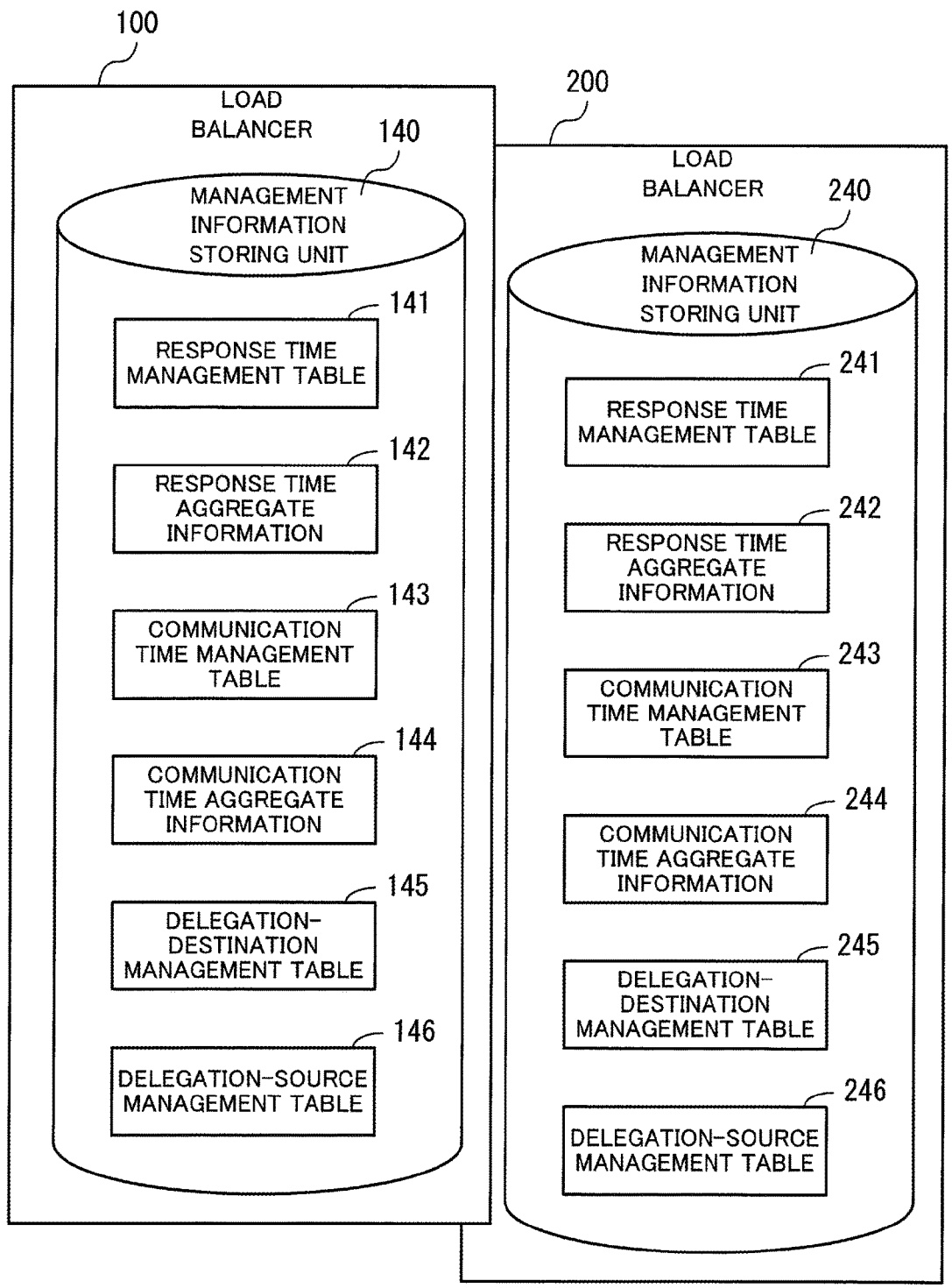
FIG. 13 illustrates an example of information stored in management information storing units.

The information stored in the management information storing units 140 and 240 is described next in detail. FIG. 13 illustrates an example of information stored in management information storing units. According to the example of FIG. 13, the management information storing units 140 and 240 individually store each of the following information items: response time management tables 141 and 241; response time aggregate information 142 and 242; communication time management tables 143 and 243; communication time aggregate information 144 and 244; delegation-destination management tables 145 and 245; and delegation-source management tables 146 and 246.

The response time management tables 141 and 241 are data tables for managing a concurrent request count and a response time for each request. The response time aggregate information 142 and 242 is aggregate results obtained by aggregating request response times for each concurrent request count. The communication time management tables 143 and 243 are data tables for managing a communication time spent by a request-destination virtual server to communicate with a lower tier virtual server during the execution of a process corresponding to each request. The communication time aggregate information 144 and 244 is aggregate results obtained by aggregating communication times for each concurrent request count. The delegation-destination management tables 145 and 245 are data tables to manage delegation-destinations to which auto scaling has been delegated. The delegation-source management tables 146 and 246 are data tables to manage delegation sources from which auto scaling has been delegated.

Next, the data structure of each of the information items stored in the management information storing unit 140 is described with a specific example.

FIG. 14 illustrates an example of a data structure of a response time management table. The response time management table 141 includes columns named identifier (ID), request-destination virtual server name, concurrent request count, and request response time. In the response time management table 141, records of individual requests transmitted to virtual servers are registered. In the identifier column, each field contains the identifier of a request transmitted to a virtual server. In the request-destination virtual server name column, each field contains the name of a virtual server to which a corresponding request was transmitted. In the concurrent request count column, each field contains the concurrent request count of a corresponding request-destination virtual server obtained at the transmission of a corresponding request. In the request response time column, each field contains the response time to a corresponding request, for example, in milliseconds.

FIG. 15 illustrates an example of a data structure of a response time aggregate information. The response time aggregate information 142 includes aggregate information sets 142a and 142b each associated with a request-destination virtual server. Each of the aggregate information sets 142a and 142b includes aggregate data values each corresponding to a different concurrent request count. Each aggregate data value is related to response times to requests the execution of which was started with a corresponding concurrent request count.

Specifically, each aggregate data value in the response time aggregate information 142 is the average response time of requests associated with a corresponding concurrent request count. Note here that the average response time is calculated using only requests the response times of which are more than an aggregate data value in a column, within the response time aggregate information 142, immediately left of the corresponding concurrent request count. For example, the aggregate information set 142a contains aggregate results related to a virtual server with a name of "host1". According to the example of FIG. 14, among requests transmitted to the virtual server with the name "host1", there are three requests associated with a concurrent request count of 3 (i.e., requests with identifiers of 3, 5, and 7). Measured response times of these requests are individually 4000, 14000, and 12000. Of them, 4000 is smaller than an aggregate data value of 11000 in a column (corresponding to a concurrent request count of 1) immediately left of the column of the concurrent request count of 3. Therefore, 4000 is excluded when calculating the average response time, and the average of 14000 and 12000, i.e., 13000, is set as an aggregate data value for the concurrent request count of 3.

FIG. 16 is an example of a data structure of a communication time management table. The communication time management table 143 includes columns named identifier (ID), request-destination virtual server name, concurrent request count, communication-destination virtual server name, and communication time. In the communication time management table 143, records of individual requests transmitted to virtual servers are registered.

In the identifier column, each field contains the identifier of a request transmitted to a virtual server. In the request-destination virtual server name column, each field contains the name of a virtual server to which a corresponding request was transmitted. In the concurrent request count column, each field contains the concurrent request count of a corresponding request-destination virtual server obtained at the transmission of a corresponding request. In the communication-destination virtual server name column, each field contains the name of a lower tier virtual server with which a corresponding request-destination virtual server communicated during a process executed in response to a corresponding request. In the communication time column, each field contains the time spent by a corresponding request-destination virtual server to communicate with a corresponding communication-destination virtual server during a process executed in response to a corresponding request.

FIG. 17 illustrates an example of a data structure of communication time aggregate information. The communication time aggregate information 144 includes aggregate information sets 144a, 144b, 144c, and 144d each associated with a pair of a request-destination virtual server and a communication-destination virtual server with which the request-destination virtual server communicated. Each of the aggregate information sets 144a, 144b, 144c, and 144d includes communication-time aggregate data values each corresponding to a different concurrent request count. Each communication-time aggregate data value is related to communication times spent by corresponding paired request-destination virtual server and communication-destination virtual server.

Specifically, each communication-time aggregate data value is the average of communication times of requests associated with a corresponding concurrent request count, which communication times were spent by corresponding paired request-destination virtual server and communication-destination virtual server during individual processes executed in response to the requests. Note that, as in the case of aggregate data values of response times, each communication-time aggregate data value for a concurrent request count may be calculated using only requests the communication times of which are more than a communication-time aggregate data value for a smaller concurrent request count. For example, in order to obtain a communication-time aggregate data value for a target concurrent request count, the auto-scaling need determining unit 130 extracts, from the communication time management table 143, only communication times exceeding a communication-time aggregate data value in a column, within the communication time aggregate information 144, immediately left of the target concurrent request count. Then, the auto-scaling need determining unit 130 sets the average of the extracted communication times as a communication-time aggregate data value for the target concurrent request count.

FIG. 18 illustrates an example of a data structure of a delegation-destination management table. In the delegation-destination management table 145, names of auto-scaling delegated load balancers are registered in association with individual numbers indicating the order of auto scaling delegation (delegation order). Each time an auto-scaling delegation request for a scale-out action is transmitted, a new record is added to the end of the delegation order in the delegation-destination management table 145. On the other hand, each time an auto-scaling delegation request for a scale-down action is transmitted, a record at the end of the delegation order in the delegation-destination management table 145 is deleted.

Figure 19:
FIG. 19 illustrates an example of a data structure of a delegation-source management table.

FIG. 19 illustrates an example of a data structure of a delegation-source management table. In the delegation-source management table 146, names of delegation-source load balancers are registered, each in association with the number of virtual servers added by scale-out actions performed in response to auto-scaling delegation requests sent from the delegation-source load balancer.

With reference to FIGS. 14 to 19, the above has described the examples of the data structures of the information items held by the load balancer 100, however, each of the remaining load balancers 200, 300, and 400 also has similar information items to those of the load balancer 100.

Using the information items illustrated in FIGS. 14 to 19, the need for a scale-out action is determined. The need for a scale-out action is determined, for example, upon reception of a request.

Figure 20:
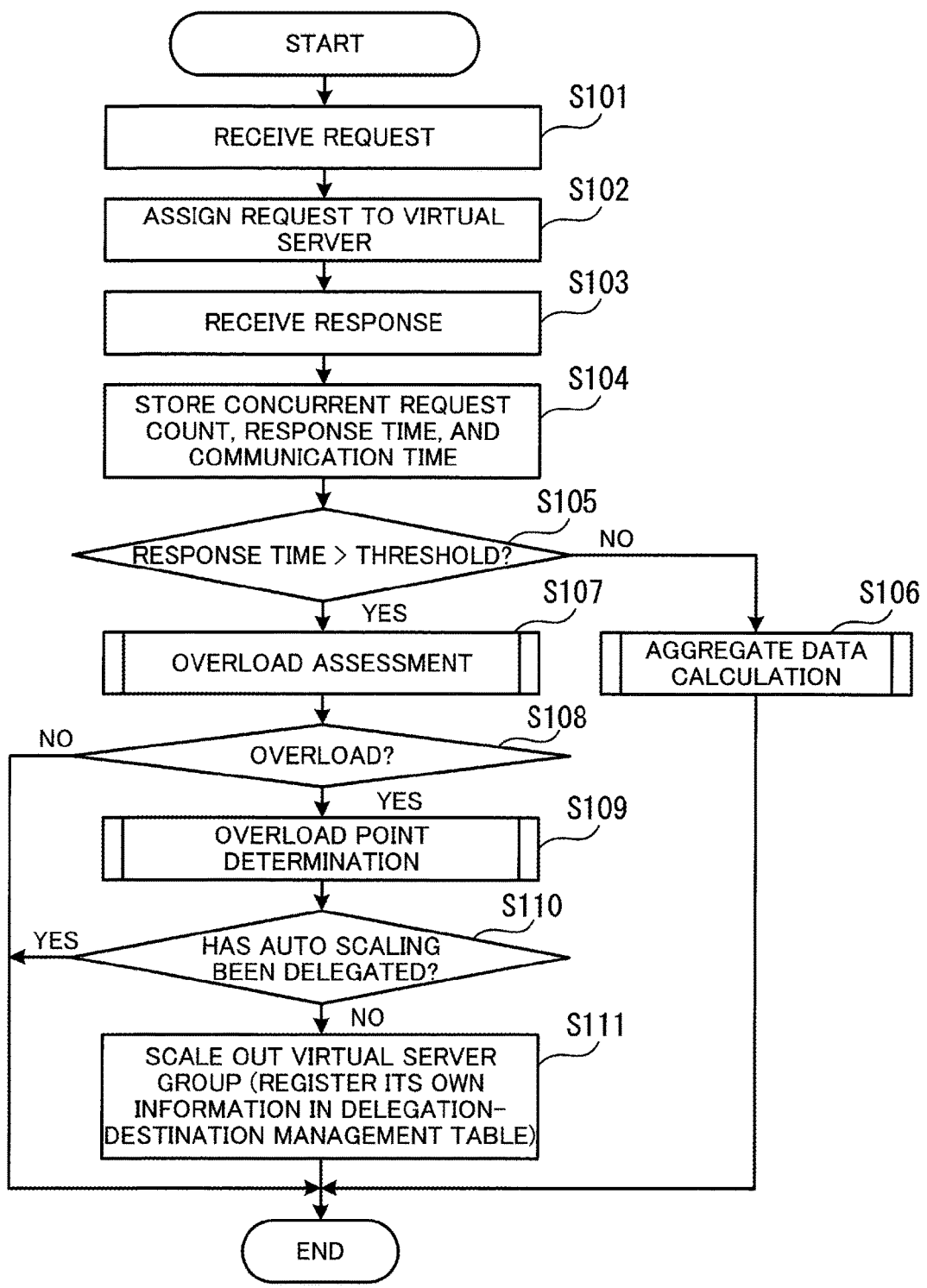
FIG. 20 is a flowchart illustrating an example of a procedure for request distribution involving a determination of the need for the scale-out action.

FIG. 20 is a flowchart illustrating an example of a procedure for request distribution involving a determination of the need for a scale-out action. The procedure illustrated in FIG. 20 is carried out by each of the load balancers 100, 200, 300, and 400 upon reception of a request, however, the following describes the case of the load balancer 100 as an example.

[Step S101] The request receiving unit 110 receives a processing request sent from one of the terminal devices 31, 32, and so on, and then transfers the received request to the load distribution control unit 120.

[Step S102] The load distribution control unit 120 determines a virtual server to be assigned the request, and transmits the request to the determined virtual server. For example, the load distribution control unit 120 uses an algorithm allowing workload to be equally distributed across available virtual servers, to thereby determine a virtual server to be assigned the request. Subsequently, the load distribution control unit 120 transmits the request to the determined virtual server.

[Step S103] The load distribution control unit 120 waits for a response from the virtual server to which the request has been transmitted. Then, upon receiving a response to the request, the load distribution control unit 120 notifies the auto-scaling need determining unit 130 of a concurrent request count of the virtual server at the start of the execution of the request and a response time of the request. The load distribution control unit 120 also obtains, from the request-destination virtual server, the name of a virtual server with which the request-destination virtual server communicated during a process executed in response to the request as well as a communication time.

[Step S104] The auto-scaling need determining unit 130 stores the concurrent request count, the response time, and the communication time in the management information storing unit 140. For example, the auto-scaling need determining unit 130 registers, in the response time management table 141 of the management information storing unit 140, the paired concurrent request count and response time in association with the name of the request-destination virtual server. In addition, the auto-scaling need determining unit 130 registers, in the communication time management table 143, the name of the request-destination virtual server, the concurrent request count, the name of the communication-destination virtual server with which the request-destination virtual server communicated, and the communication time in association with one another.

[Step S105] The auto-scaling need determining unit 130 determines whether the response time of the request assigned in step S102 is more than a predetermined threshold. If the response time is more than the threshold, the process moves to step S107. If not, the process moves to step S106.

[Step S106] When the response time is not more than the threshold (NO in step S105), the auto-scaling need determining unit 130 calculates aggregate data. Note that the details of the aggregate data calculation process are described later (see FIG. 21). When the aggregate data calculation is completed, the process ends.

[Step S107] When the response time is more than the threshold (YES in step S105), the auto-scaling need determining unit 130 determines whether the lengthening of the response time is attributable to processing overload occurring somewhere within the system. Note that the details of the overload assessment process are described later (see FIG. 22).

[Step S108] If determining that the lengthening of the response time is attributable to work overload, the auto-scaling need determining unit 130 moves the process to step S109. On the other hand, if determining that the lengthening of the response time is not attributable to work overload, the auto-scaling need determining unit 130 ends the process.

[Step S109] When determining that the lengthening of the response time is attributable to work overload (YES in step S108), the auto-scaling need determining unit 130 carries out an overload point determination process, where a determination is made of whether work overload is occurring at virtual servers in a tier for which the load balancer 100 is in charge of distributing requests. If it is determined that work overload is not occurring at virtual servers in the tier, auto scaling is delegated to a different load balancer in charge of distributing requests across virtual servers in a lower tier. The details of the overload point determination process are described later (see FIG. 23).

[Step S110] When auto scaling is delegated in step S109, the auto-scaling need determining unit 130 ends the process. If auto scaling is not delegated in step S109, the auto-scaling need determining unit 130 moves the process to step S111. Note that auto scaling is not delegated when work overload is determined to be taking place at virtual servers in the tier for which the load balancer 100 is in charge of distributing requests.

[Step S111] The auto-scaling need determining unit 130 determines to perform a scale-out action for the virtual server group for which the load balancer 100 is in charge of distributing requests. Then, the auto-scaling need determining unit 130 requests the auto-scaling requesting unit 150 to transmit an auto-scaling request for a scale-out action. In response to the request, the auto-scaling requesting unit 150 transmits the auto-scaling request for a scale-out action to the virtualization device 45. Upon receiving the auto-scaling request, the virtualization device 45 instructs the physical server 41 to start a new virtual server and bring the virtual server to initiate the operation of services. In this regard, the auto-scaling need determining unit 130 registers information identifying itself (the identifier of the load balancer 100, for example) in the delegation-destination management table 145.

In the above-described manner, the request distribution at the reception of each request and the auto scaling need determination are carried out.

Figure 21:
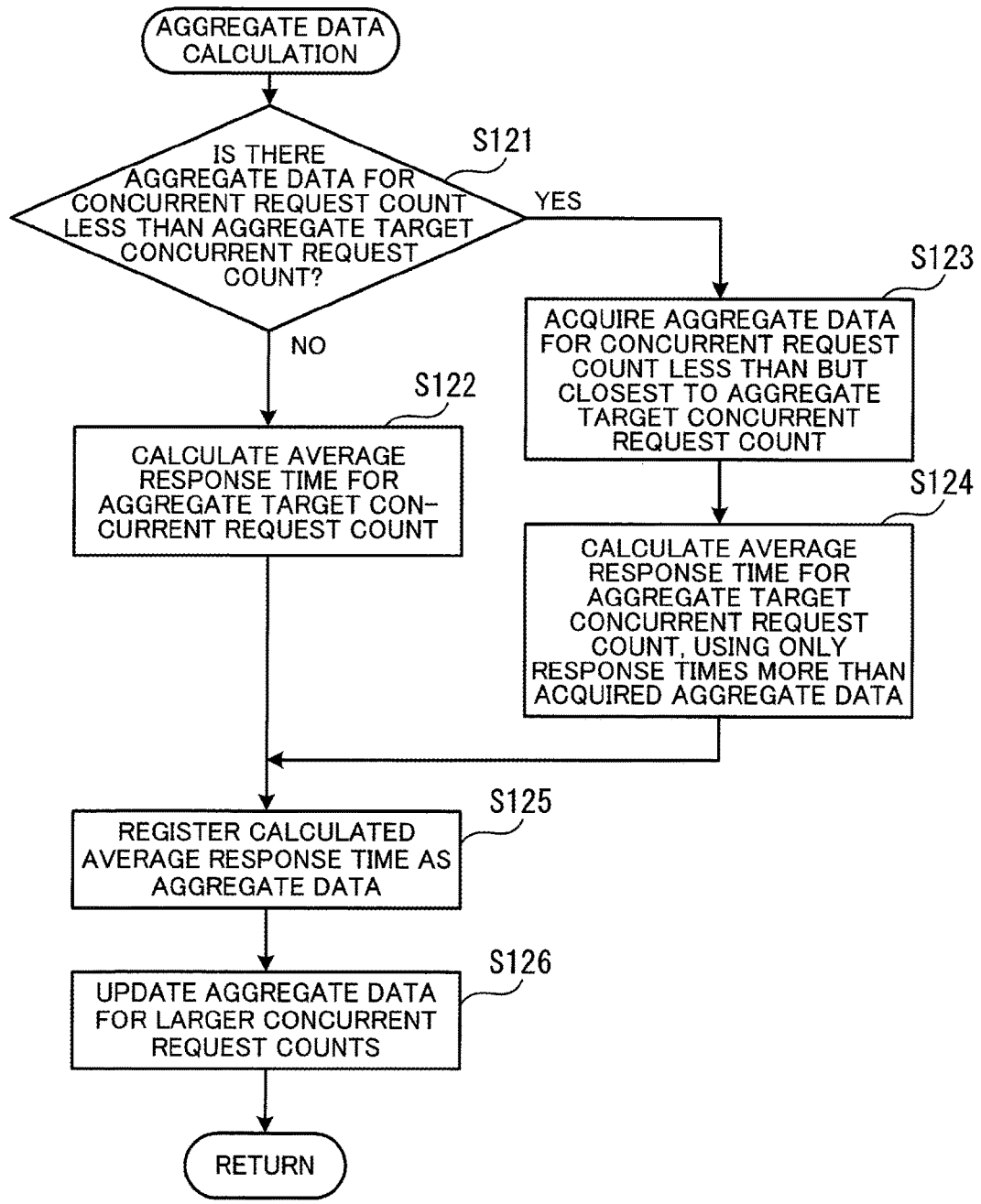
FIG. 21 is a flowchart illustrating an example of a procedure for aggregate data calculation.

The aggregate data calculation process is described next in detail. FIG. 21 is a flowchart illustrating an example of a procedure for aggregate data calculation.

[Step S121] The auto-scaling need determining unit 130 refers, in the response time aggregate information 142, to an aggregate information set of a request-destination virtual server to which the request having been executed this time was transmitted (hereinafter in the description of FIG. 21 referred to as the "aggregate target virtual server"). Then, the auto-scaling need determining unit 130 determines whether there is aggregate data for one or more concurrent request counts each less than the concurrent request count of the request having been executed this time (the "aggregate target concurrent request count"). If there is such aggregate data, the process moves to step S123. If not, the process moves to step S122.

[Step S122] When it is determined in step S121 that there is no appropriate aggregate data, the auto-scaling need determining unit 130 calculates the average response time for individual requests associated with the aggregate target concurrent request count. For example, the auto-scaling need determining unit 130 extracts, from the response time management table 141, records each having a pair of the aggregate target virtual server and the aggregate target concurrent request count, to thereby calculate the arithmetic average of response times of the extracted records. Subsequently, the process moves to step S125.

[Step S123] The auto-scaling need determining unit 130 refers, in the response time aggregate information 142, to an aggregate information set of the aggregate target virtual server. Then, the auto-scaling need determining unit 130 acquires, from the referred-to aggregate information set, an aggregate data value for a concurrent request count closest to the aggregate target concurrent request count amongst the concurrent request counts each less than the aggregate target concurrent request count.

[Step S124] The auto-scaling need determining unit 130 calculates the average response time for the aggregate target concurrent request count by using, amongst response times of individual requests associated with the aggregate target concurrent request count, only response times more than the aggregate data value acquired in step S123. For example, the auto-scaling need determining unit 130 extracts, from the response time management table 141, records each having a pair of the aggregate target virtual server and the aggregate target concurrent request count. Then, the auto-scaling need determining unit 130 calculates the arithmetic average response time by using, amongst response times of the extracted records, only response times more than the aggregate data value acquired in step S123.

[Step S125] The auto-scaling need determining unit 130 registers the calculated average response time as an aggregate data for the aggregate target concurrent request count. For example, the auto-scaling need determining unit 130 registers, in the aggregate information set of the aggregate target virtual server, the calculated average response time as the aggregate data value for the aggregate target concurrent request count.

[Step S126] The auto-scaling need determining unit 130 updates aggregate data for concurrent request counts more than the concurrent request count of the registered aggregate data. For example, the auto-scaling need determining unit 130 selects, amongst concurrent request counts in the aggregate information set of the aggregate target virtual server, one concurrent request count more than the concurrent request count of the aggregate data registered in step S125, sequentially in ascending order. Then, the auto-scaling need determining unit 130 sets the selected concurrent request count as the aggregate target concurrent request count, and repeats steps S123 to S125 to thereby update the aggregate data for the selected concurrent request count.

Figure 22:
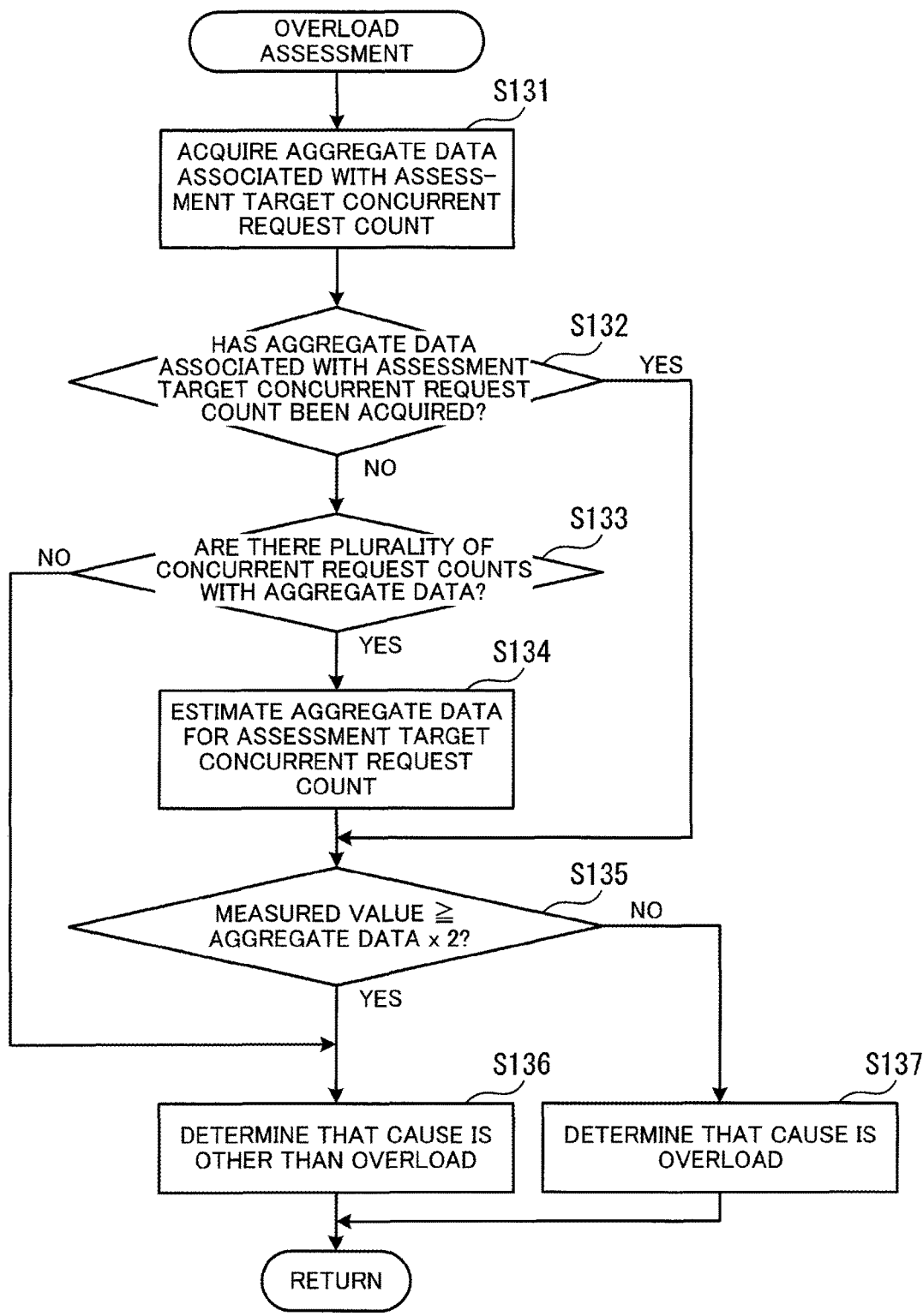
FIG. 22 is a flowchart illustrating an example of a procedure for an overload assessment.

In the above-described manner, the aggregate data is calculated. The overload assessment process is described next in detail. FIG. 22 is a flowchart illustrating an example of a procedure for an overload assessment.

[Step S131] The auto-scaling need determining unit 130 acquires aggregate data for the concurrent request count associated with the request the response time of which is more than the threshold (hereinafter in the description of FIG. 22 referred to as the "assessment target concurrent request count"). For example, the auto-scaling need determining unit 130 refers, in the response time aggregate information 142, to an aggregate information set corresponding to a virtual server having executed the request the response time of which is more than the threshold (the "response delay virtual server"). Then, the auto-scaling need determining unit 130 acquires, from the referred-to aggregate information set, aggregate data associated with the assessment target concurrent request count.

[Step S132] The auto-scaling need determining unit 130 determines whether the aggregate data associated with the assessment target concurrent request count has been acquired in step S131. For example, if an aggregate data value associated with the assessment target concurrent request count is registered in the aggregate information set of the response delay virtual server, the auto-scaling need determining unit 130 is able to acquire the aggregate data. On the other hand, if no aggregate data value associated with the assessment target concurrent request count is registered in the aggregate information set of the response delay virtual server, the auto-scaling need determining unit 130 is not able to acquire the aggregate data. If the aggregate data has been acquired, the process moves to step S135. If not, the process moves to step S133.

[Step S133] When no aggregate data is acquired in step S131 (NO in step S132), the auto-scaling need determining unit 130 determines whether aggregate data for a plurality of concurrent request counts is present in the aggregate information set of the response delay virtual server in the response time aggregate information 142. If there are two or more concurrent request counts with aggregate data, the process moves to step S134. If there is one or less concurrent request count with aggregate data, the process moves to step S136.

[Step S134] When there are two or more concurrent request counts for which aggregate data has been registered (YES in step S133), the auto-scaling need determining unit 130 estimates aggregate data of the assessment target concurrent request count based on the registered aggregate data. For example, the auto-scaling need determining unit 130 extracts the concurrent request counts with aggregate data from the aggregate information set corresponding to the response delay virtual server in the response time aggregate information 142. Then, the auto-scaling need determining unit 130 identifies, amongst the extracted concurrent request counts, concurrent request counts closest and second closest to the assessment target concurrent request count. Next, based on the aggregate data associated with the two identified concurrent request counts, the auto-scaling need determining unit 130 finds a linear expression indicating the relationship between the concurrent request counts and the aggregate data. When plotted on a graph of the concurrent request count on the horizontal axis against the aggregate data on the vertical axis, the obtained linear expression is a straight line passing through two points representing the two identified concurrent request counts and their associated aggregate data. Based on the linear expression, the auto-scaling need determining unit 130 estimates aggregate data for the assessment target concurrent request count. That is, the auto-scaling need determining unit 130 plugs the assessment target concurrent request count into the linear expression to thereby obtain estimated aggregate data for the assessment target concurrent request count.

[Step S135] The auto-scaling need determining unit 130 determines whether the response time (measured value) of the request, having exceeded the threshold, is twice or more than twice the aggregate data of the assessment target concurrent request count. If the response time is twice or more than twice the aggregate data, the process moves to step S136. If the response time is less than twice the aggregate data, the process moves to step S137.

[Step S136] When aggregate data for the assessment target concurrent request count is absent and also is not able to be estimated (NO in step S133), and when the response time of the request, having exceeded the threshold, is twice or more than twice the aggregate data (YES in step S135), the auto-scaling need determining unit 130 determines that the lengthening of the response time is attributable to a cause other than work overload. Subsequently, the overload assessment process ends.

[Step S137] When the response time of the request, having exceeded the threshold, is less than twice the aggregate data (NO in step S135), the auto-scaling need determining unit 130 determines that the lengthening of the response time is attributable to work overload. Subsequently, the overload assessment process ends.

Figure 23:
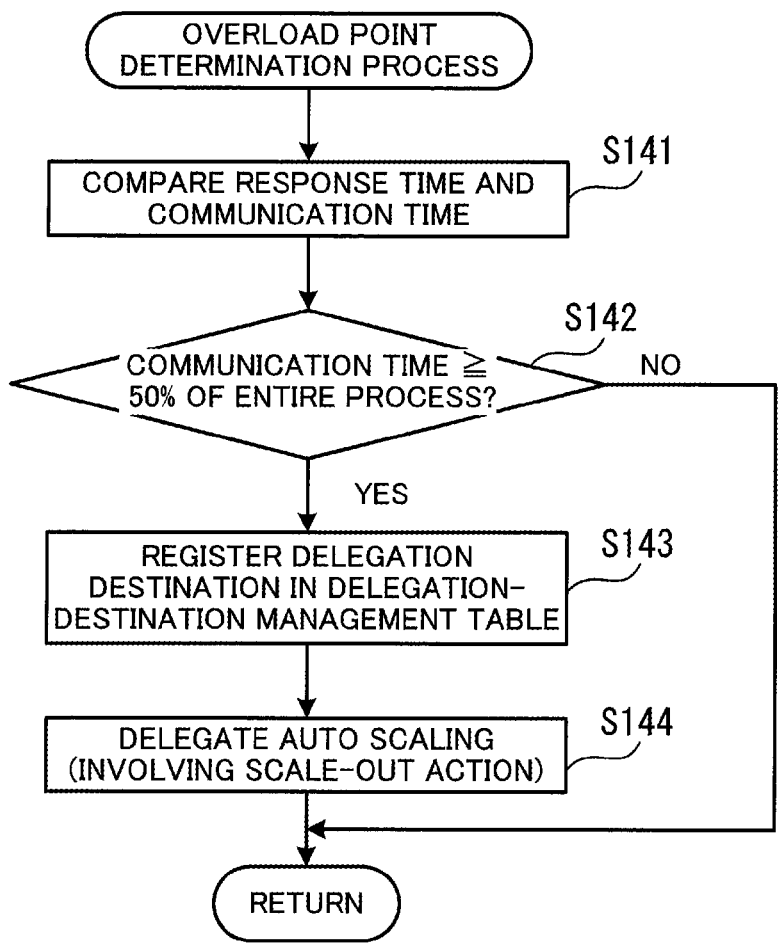
FIG. 23 is a flowchart illustrating an example of a procedure for overload point determination.

In the above-described manner, it is assessed whether the lengthening of the response time is attributable to work overload or some other cause. When work overload is determined to be the cause, the overload point determination process is carried out. FIG. 23 is a flowchart illustrating an example of a procedure for overload point determination.

[Step S141] The auto-scaling need determining unit 130 compares the response time of the request having been executed this time and a communication time corresponding to the concurrent request count of the current request. For example, referring to the communication time aggregate information 144, the auto-scaling need determining unit 130 acquires, from an aggregate information set corresponding to the request-destination virtual server of the current request, communication-time aggregate data associated with the concurrent request count of the current request. Then, the auto-scaling need determining unit 130 divides the acquired communication time by the response time of the current request.

Note that the time (actual time) spent by the virtual server having executed a process corresponding to the current request to communicate with a different virtual server in the course of the execution of the process may be used, instead, to be compared with the response time of the current request.

[Step S142] The auto-scaling need determining unit 130 determines whether the communication time accounts for 50% of the entire process executed in response to the current request. For example, when the result obtained by dividing the communication time by the response time is 0.5 or more, the communication time accounts for 50% or more of the entire process. If the communication time accounts for 50% or more of the entire process, work overload is determined to be occurring at virtual servers other than the virtual servers for which the load balancer 100 is in charge of distributing requests, and then the process moves to step S143. If the communication time accounts for less than 50% of the entire process, work overload is determined to be occurring at the virtual servers for which the load balancer 100 is in charge of distributing requests, and then the overload point determination process ends.

[Step S143] When the communication time accounts for 50% or more of the entire process (YES in step S142), the auto-scaling need determining unit 130 identifies a load balancer in charge of distributing requests to a virtual server with which the virtual server having executed a process corresponding to the current request communicated in the course of the execution of the process. Then, the auto-scaling need determining unit 130 additionally registers the name of the identified load balancer to the end of the delegation-destination management table 145.

[Step S144] The auto-scaling need determining unit 130 requests the auto-scaling delegation requesting unit 160 to transmit an auto-scaling delegation request to the load balancer identified in step S143. In response to the request, the auto-scaling delegation requesting unit 160 transmits the auto-scaling delegation request for a scale-out action to the identified load balancer. Note that the auto-scaling delegation request includes the identifier of the request the response time of which has exceeded the threshold, the communication time spent by the virtual server to communicate with the different virtual server during the execution of the request, and the name of the load balancer 100 itself.

Figure 24:
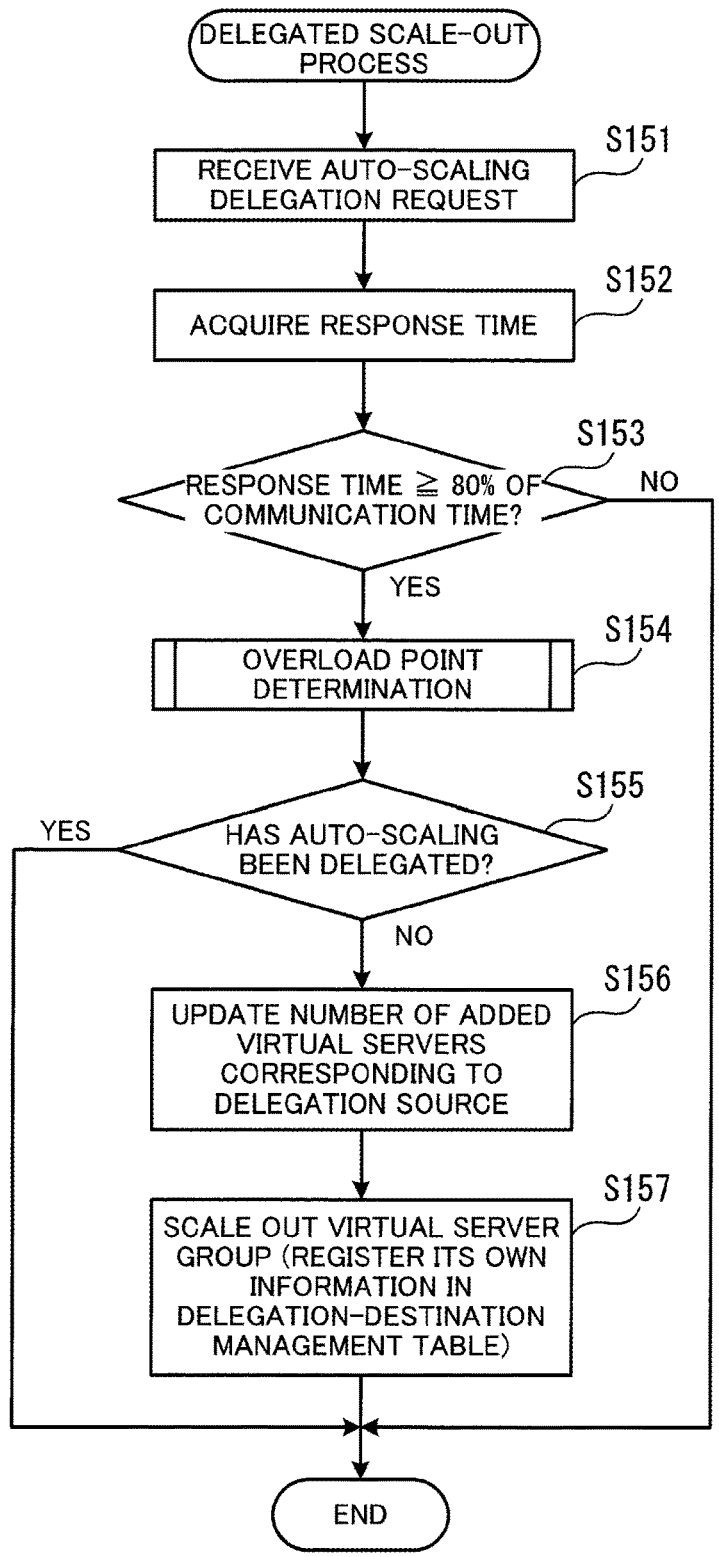
FIG. 24 is a flowchart illustrating an example of a procedure for a delegated scale-out action.

Next described is a process carried out by a load balancer having received an auto-scaling delegation request for a scale-out action (delegated scale-out process). FIG. 24 is a flowchart illustrating an example of a procedure for a delegated scale-out action. Assume in the following that the load balancer 200 executes the process of FIG. 24.

[Step S151] The auto-scaling delegation receiving unit 270 receives, from the load balancer 100, an auto-scaling delegation request for a scale-out action. Then, the auto-scaling delegation receiving unit 270 transfers the received auto-scaling delegation request to the auto-scaling need determining unit 230.

[Step S152] The auto-scaling need determining unit 230 obtains a response time of a request issued to a lower tier virtual server in the course of the execution of a request the response time of which has exceeded the threshold at an upper tier virtual server. For example, the auto-scaling need determining unit 230 acquires, from the response time management table 241, a response time corresponding to the identifier of a request indicated by the auto-scaling delegation request. The acquired response time is the response time of a request issued to the lower tier virtual server.

[Step S153] The auto-scaling need determining unit 230 determines whether the response time accounts for 80% or more of a communication time. For example, the auto-scaling need determining unit 230 divides the response time obtained in step S152 by a communication time indicated by the auto-scaling delegation request. If the division result is 0.8 or more, the response time accounts for 80% or more of the communication time. If the response time accounts for 80% or more of the communication time, the process moves to step S154. If the response time accounts for less than 80%, the lengthening of the response time is likely to be attributed to, not work overload of virtual servers, but communication overload, and therefore the process ends without carrying out a scale-out action.

[Step S154] When the response time accounts for 80% or more of the communication time (YES in step S153), the auto-scaling need determining unit 230 carries out the overload point determination process, the details of which are as described in FIG. 23.

[Step S155] When auto scaling is delegated in step S154, the auto-scaling need determining unit 230 ends the process. When auto scaling is not delegated in step S154, the auto-scaling need determining unit 230 moves the process to step S156.

[Step S156] The auto-scaling need determining unit 230 updates the number of added virtual servers corresponding to the delegation-source load balancer 100. For example, the auto-scaling need determining unit 230 increases, by 1, the number of added virtual servers corresponding to the name of the load balancer 100 within the delegation-source management table 246 of the management information storing unit 240.

[Step S157] The auto-scaling need determining unit 230 determines to perform a scale-out action for the virtual server group for which the load balancer 200 is in charge of distributing requests. Then, the auto-scaling need determining unit 230 requests the auto-scaling requesting unit 250 to transmit an auto-scaling request for a scale-out action. In response to the request, the auto-scaling requesting unit 250 transmits the auto-scaling request for a scale-out action to the virtualization device 45. Upon receiving the auto-scaling request, the virtualization device 45 instructs the physical server 42 to start a new virtual server and bring the virtual server to initiate the operation of services. In this regard, the auto-scaling need determining unit 230 registers information identifying itself (the identifier of the load balancer 200, for example) in the delegation-destination management table 245.

In the above-described manner, if, when a process according to a request from one of the terminal devices 31, 32, and so on is executed, the response time to the request has been extended due to work overload of a virtual server, a scale-out action is automatically carried out. Note that according to the system of the second embodiment, a scale-down action is automatically carried out when workload of the system has decreased. A scale-down control method is described next.

Figure 25:
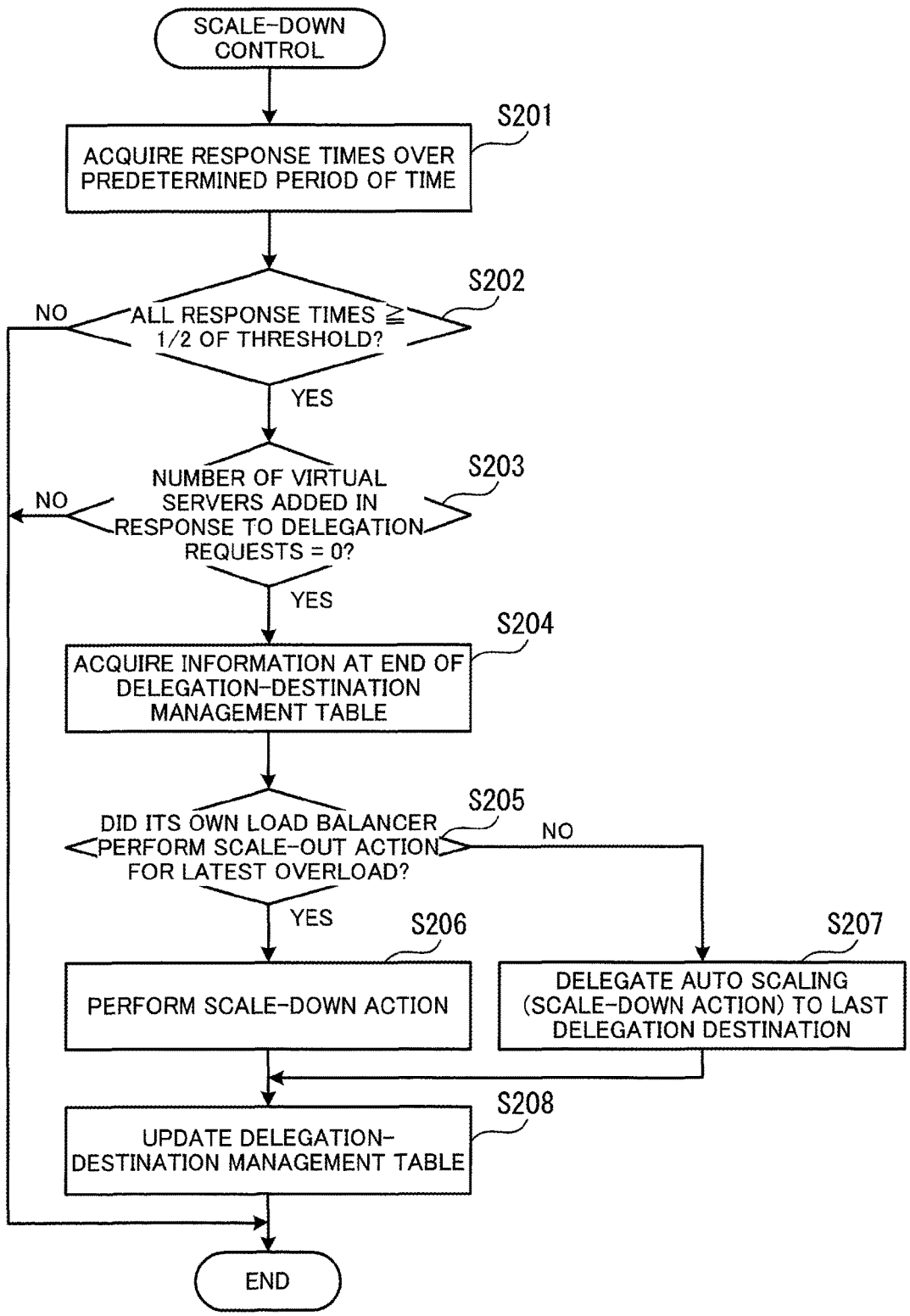
FIG. 25 is a flowchart illustrating an example of a procedure for scale-down control.

FIG. 25 is a flowchart illustrating an example of a procedure for scale-down control. The procedure illustrated in FIG. 25 is carried out by each of the load balancers 100, 200, 300, and 400, however, the following describes the case of the load balancer 100 as an example.

[Step S201] The auto-scaling need determining unit 130 acquires response times for distributed requests over a predetermined period of time (for example, 30 minutes).

[Step S202] The auto-scaling need determining unit 130 determines whether all of the acquired response times are sufficiently short (for example, one-half or less of the response time threshold for a scale-out action). If all the response times are sufficiently short, the process moves to step S203. If at least one of the response times is not sufficiently short, the process ends.

[Step S203] The auto-scaling need determining unit 130 determines whether the number of virtual servers added by scale-out actions in response to auto-scaling delegation requests is 0. For example, the auto-scaling need determining unit 130 determines that the number of added virtual servers is 0 when 0's are set in all the fields in the number of added virtual servers column within the delegation-source management table 146. If the number of added virtual servers is 0, the process moves to step S204. If not, the process ends without carrying out a scale-down action.

Note here that the load balancer 100 never carries out a scale-out action in response to an auto-scaling delegation request because of being in charge of distributing requests across the virtual servers 41a and 41b in the first tier of the multi-tier system. That is, YES is always obtained in step S203. Therefore, step S203 is effective only when the remaining load balancers 200, 300, and 400 carry out the scale-down control of FIG. 25.

[Step S204] The auto-scaling need determining unit 130 acquires, from the delegation-destination management table 145, an auto-scaling delegated load balancer name appearing last in the delegation order.

[Step S205] Based on the load balancer name obtained in step S204, the auto-scaling need determining unit 130 determines whether its own load balancer 100 transmitted an auto-scaling request for a scale-out action when having made the latest overload determination. For example, if the name acquired in step S204 is the name of the load balancer 100 itself, the auto-scaling need determining unit 130 determines that its own load balancer 100 issued an auto-scaling request for a scale-out action when having made the latest overload determination. If the name acquired in step S204 is the name of a different load balancer, the auto-scaling need determining unit 130 determines that its own load balancer 100 transmitted an auto-scaling delegation request to a load balancer identified by the acquired name when having made the latest overload determination.

If its own load balancer 100 issued an auto-scaling request for a scale-out action when the auto-scaling need determining unit 130 made the latest overload determination, the process moves to step S206. If its own load balancer 100 transmitted an auto-scaling delegation request to a different load balancer when the auto-scaling need determining unit 130 made the latest overload determination, the process moves to step S207.

[Step S206] When its own load balancer 100 issued an auto-scaling request for a scale-out action (YES in step S205) after the auto-scaling need determining unit 130 made the latest overload determination, the auto-scaling need determining unit 130 requests the auto-scaling requesting unit 150 to transmit an auto-scaling request for a scale-down action. In response, the auto-scaling requesting unit 150 transmits the auto-scaling request to the virtualization device 45 to perform a scale-down action for virtual servers running on the physical server 41. Upon receiving the auto-scaling request, the virtualization device 45 instructs the physical server 41 to stop one virtual server. Then, one virtual server on the physical server 41 is stopped. Subsequently, the process moves to step S208.

[Step S207] When its own load balancer 100 transmitted an auto-scaling delegation request to a different load balancer (NO in step S205) after the auto-scaling need determining unit 130 made the latest overload determination, the auto-scaling need determining unit 130 delegates auto scaling for a scale-down action to the last delegation destination. For example, the auto-scaling need determining unit 130 requests the auto-scaling delegation requesting unit 160 to transmit an auto-scaling delegation request for a scale-down action. Then, the auto-scaling delegation requesting unit 160 transmits the auto-scaling delegation request for a scale-down action to a load balancer to which auto scaling for a scale-out action was delegated the last time. Upon receiving the auto-scaling delegation request, the load balancer carries out scale-down control (delegated scale-down control) according to the auto-scaling delegation request.

[Step S208] The auto-scaling need determining unit 130 updates the delegation-destination management table 145. For example, when transmitting the auto-scaling request for a scale-down action in step S206, the auto-scaling need determining unit 130 deletes a record appearing last in the delegation order from the delegation-destination management table 145 in response to auto-scaling completion notification sent from the virtualization device 45. On the other hand, when transmitting the auto-scaling delegation request in step S207, the auto-scaling need determining unit 130 deletes a record appearing last in the delegation order from the delegation-destination management table 145 in response to auto-scaling completion notification sent from the request-destination load balancer.

Figure 26:
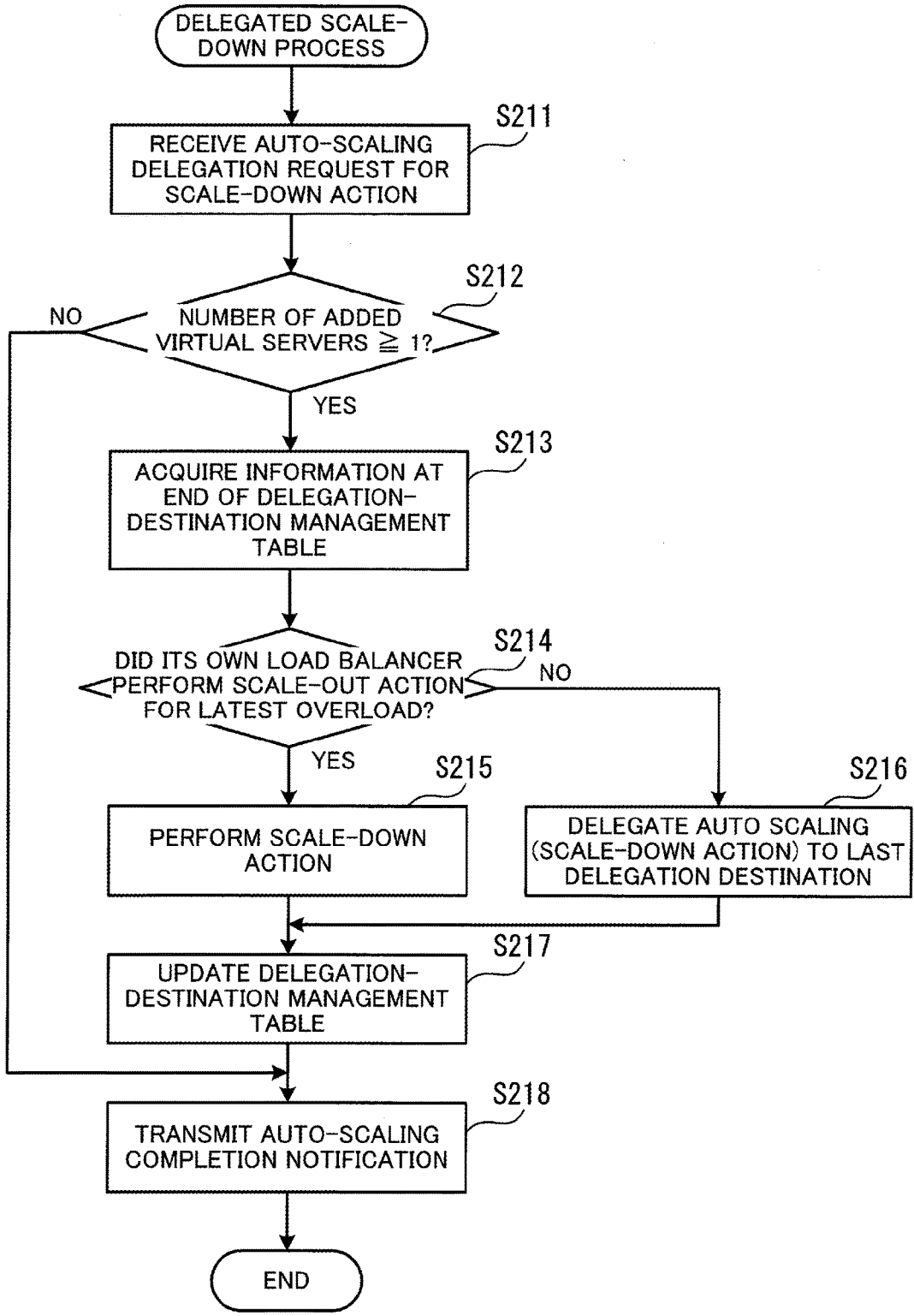
FIG. 26 is a flowchart illustrating an example of a procedure for delegated scale-down control.

Next described is delegated scale-down control at a load balancer having received an auto-scaling delegation request for a scale-down action. FIG. 26 is a flowchart illustrating an example of a procedure for delegated scale-down control. Assume in the following that the load balancer 200 carries out the process of FIG. 26. Note that individual steps S213 to S217 of FIG. 26 are the same as steps S204 to 208, respectively, of FIG. 25, and the following therefore describes steps S211, S212, and S218 different from the steps in FIG. 25.

[Step S211] The auto-scaling delegation receiving unit 270 receives, from the load balancer 100, an auto-scaling delegation request for a scale-down action. The auto-scaling delegation receiving unit 270 transfers the received auto-scaling delegation request to the auto-scaling need determining unit 230.

[Step S212] The auto-scaling need determining unit 230 determines whether the number of virtual servers added by delegation of auto scaling by the delegation source is 1 or more. For example, the auto-scaling need determining unit 230 refers to the delegation-source management table 246 to thereby determine the number of added virtual servers corresponding to the name of a load balancer from which the auto-scaling delegation request was received is 1 or more. If the number of added virtual servers is 1 or more, the process moves to step S213. If the number of added virtual servers is 0, no scale-down action is determined to take place and the process moves to step S218.

[Step S218] The auto-scaling delegation receiving unit 270 transmits auto-scaling completion notification to the load balancer having transmitted the auto-scaling delegation request.

In the above-described manner, an appropriate scale-down action by auto scaling is carried out. That is, virtual servers in a tier where a scale-out action was previously carried out when a response time was delayed are scaled down once response times fall to or below a predetermined value. As a result, the system as a whole is able to maintain the performance of responding to the terminal devices 31, 32, and so on at an appropriate level. At the same time, removing performance loss other than workload concentration from auto scaling targets prevents wasteful use of server resources.

Further, according to the second embodiment, response times of requests are classified according to concurrent request counts obtained at the start of the execution of the individual requests, for an analysis purpose. Then, extended response time assessment is made based on response times of requests for processes that are responsible for response time increases. This prevents the accuracy of determining a cause for an extended response time from being reduced by requests for processes having low impacts on workload of virtual servers, thus producing a correct assessment result.

That is, if whether one-dimensional data, such as CPU utilization or response times, exceeds a threshold is used as a condition of auto scaling implementation, auto scaling would be carried out even for performance degradation due to malfunction of an application. As has been described in the second embodiment, by using two-dimensional data of a combination of the response time of each request and its concurrent request count, it is possible to appropriately detect the case where an extended response time is attributable to malfunction of an application or the like. As a result, a useless scale-out action is prevented.

Note however that a simple combination of the response time of each request and its concurrent request count lets short response times be included in aggregate data, and therefore does not produce an appropriate graph to check the trend of high load processes with long response times, which are primary targets for load distribution. According to the second embodiment, in a graph where the response time of each request is plotted against its concurrent request count, a newly compiled response time is compared with the average response time of a concurrent request count located adjacent to and on the left side of the concurrent request count associated with the newly compiled response time, and the newly compiled response time is excluded from aggregate targets if it is less than the average response time. Herewith, it is possible to obtain the real trend of high load processes.

Further, in the case of a system where virtual servers operate in cooperation with each other, it is difficult to see for which virtual server a scale-out action needs to be carried out to improve the performance of the system. According to the second embodiment, each load balancer in charge of distributing requests across individual virtual servers aggregates information pieces, each composed of a response time of a request and a concurrent request count associated with the request, and auto scaling is delegated from a load balancer having detected threshold exceedance of a request response time sequentially to lower load balancers. This allows a virtual server causing a delay in the response time to be automatically tracked down so that auto scaling is implemented for an appropriate virtual server.

Note that the system according to the second embodiment may be applied to a cloud environment in which a user is able to use as many servers as he/she wants when he/she wants (for example, a public cloud hosted by an external vendor). In such a cloud environment, the service is typically charged based on the operating time of virtual servers used. Therefore, the application of the second embodiment prevents useless scale-out actions, thus avoiding additional charges for the operation of unnecessary servers.

According to the second embodiment, the load balancers make determination of the need for auto scaling, however, a different apparatus may monitor a response time of each request and determine the need for auto scaling. For example, the virtualization device 45 may capture communication on the network to measure a response time of each request and determine the need for auto scaling. Alternatively, each of the physical servers 41 to 44 may measure a response time of each request that the physical server has received and determine the need for auto scaling.

In the aggregate data calculation according to the second embodiment, the median or a different representative value of response times may be used in place of the average response time. Note however that in the case where there are a large number of requests for processes the response times of which fluctuate a little with workload variations compared to requests for processes the response times of which fluctuate largely with workload variations, the median is a response time of a process the response time of which fluctuates a little with workload variations. In this case, in calculating aggregate data for a larger concurrent request count, response times fluctuating a little with workload variations may not be appropriately excluded from elements used for the calculation. In view of this, it is preferable to use the average, instead of the median, as the aggregate data in the case where requests for processes the response times of which fluctuate a little with workload variations are predominant in number compared to requests for processes the response times of which fluctuate largely with workload variations.

While, as described above, the embodiments have been exemplified, the configurations of individual portions illustrated in the embodiments may be replaced with others having the same functions. In addition, another constituent element or process may be added thereto. Furthermore, two or more compositions (features) of the embodiments may be combined together.

According to one aspect, appropriate allocation of resources of information processing apparatuses is ensured.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing therein a computer program that causes a management apparatus to perform a procedure comprising:
   transmitting requests to one or more information processing apparatuses;
   receiving responses from the one or more information processing apparatuses;
   obtaining, with respect to each of the requests, based on a transmission time of the each request and a reception time of a response to the each request, a processing time in association with an execution of a process by one of the one or more information processing apparatuses according to the each request, the processing time spanning a start to completion of the execution of the process;
compiling, in a memory, a concurrent process count and the processing time in association with the each request, the concurrent process count indicating a number of processes being executed by the one information processing apparatus at the start of the execution of the process;
calculating, with respect to each concurrent process count, an average value of a subset of processing times each associated with the each concurrent process;
determining need for an addition to resources of the one or more information processing apparatuses based on a newly compiled processing time and an average value of a concurrent process count associated with the newly compiled processing time; and
transmitting an auto-scaling request for scale-out when the addition to the resources is determined,
wherein the calculating includes:
identifying, amongst concurrent process counts less than an aggregate target concurrent process count whose average value is to be calculated, a largest concurrent process count whose average value has been calculated;
excluding first processing times from aggregate target processing times associated with the aggregate target concurrent process count, the first processing times each being equal to or less than an average value calculated for the largest concurrent process count; and
calculating an average value of second processing times associated with the aggregate target concurrent process, the second processing times being included in the aggregate target processing times and not excluded from the aggregate target processing times by the excluding.

2. The non-transitory computer-readable storage medium according to claim 1, wherein:
the determining includes estimating, when the average value of the concurrent process count associated with the newly compiled processing time has yet to be calculated, the average value based on average values calculated for different concurrent process counts.

3. The non-transitory computer-readable storage medium according to claim 2, wherein:
the average value of the concurrent process count associated with the newly compiled processing time is estimated based on an expression representing an increase degree of average values with increasing concurrent process count, the expression being obtained based on average values of two concurrent process counts closest to the concurrent process count associated with the newly compiled processing time, which two concurrent process counts are identified amongst concurrent process counts whose average values have been calculated.

4. The non-transitory computer-readable storage medium according to claim 1, wherein:
the determining includes determining the addition to the resources when the newly compiled processing time is more than a predetermined threshold but less than a value obtained by multiplying the average value of the concurrent process count associated with the newly compiled processing time by a first predetermined value.

5. The non-transitory computer-readable storage medium according to claim 4, wherein:
the determining includes determining a reduction in the resources when all processing times compiled for a latest predetermined period of time are less than or equal to a second predetermined value less than the predetermined threshold.

6. The non-transitory computer-readable storage medium according to claim 1, wherein:
when the one or more information processing apparatuses deployed in a multi-tier configuration execute processes according to individual processing requests in cooperation with each other,
the compiling includes compiling, in association with the each request, a concurrent process count, a processing time, and a communication time spent by a specific one of the one or more information processing apparatuses to communicate with an information processing apparatus in a lower tier than the specific information processing apparatus each time the specific information processing apparatus has executed a process according to a received processing request, and
the determining includes determining the addition to the resources when the newly compiled processing time is more than a predetermined threshold but less than a value obtained by multiplying the average value of the concurrent process count associated with the newly compiled processing time by a first predetermined value and a proportion of a communication time associated with the newly compiled processing time to the newly compiled processing time is less than a second predetermined value.

7. The non-transitory computer-readable storage medium according to claim 6, wherein:
the determining includes determining an addition to resources of the lower-tier information processing apparatus when the newly compiled processing time is more than the predetermined threshold but less than the obtained value and the proportion is more than or equal to the second predetermined value, and transmitting a resource addition request to a different management apparatus managing an amount of the resources of the lower-tier information processing apparatus, to be allocated for execution of processes according to processing requests.

8. The non-transitory computer-readable storage medium according to claim 7, wherein the procedure further includes:
determining the addition to the resources, upon reception of the resource addition request from a different management apparatus managing an amount of resources of an information processing apparatus in an upper tier than the specific information processing apparatus, to be allocated for execution of processes according to processing requests, when a proportion of a processing time of a process executed by the specific information processing apparatus in response to a processing request to a communication time spanning a start to an end of communication conducted by the upper-tier information processing apparatus in a course of executing a process whose processing time is more than the threshold is more than or equal to a third predetermined value, the processing request being sent through the communication.

9. The non-transitory computer-readable storage medium according to claim 7, wherein:

the determining includes determining a reduction in the resources when the newly compiled processing time is less than or equal to a third predetermined value less than the predetermined threshold and no resource addition request has been transmitted to the different management apparatus after determining the addition to the resources.

10. The non-transitory computer-readable storage medium according to claim 9, wherein:
the determining includes transmitting a resource reduction request to the different management apparatus when the newly compiled processing time is less than or equal to the third predetermined value and no determination of the addition to the resources has been made after transmitting the resource addition request to the different management apparatus.

11. The non-transitory computer-readable storage medium according to claim 10, wherein the procedure further includes:
determining, upon receiving a resource reduction request from a different management apparatus, to reduce resources of the specific information processing apparatus, to be allocated for execution of processes according to processing requests, by not more than an amount of resources added in response to the response addition request transmitted from the different management apparatus, the different management apparatus managing an amount of resources of an information processing apparatus in an upper tier than the specific information processing apparatus, to be allocated for execution of processes according to processing requests.

12. A management method comprising:
transmitting requests to one or more information processing apparatuses;
receiving responses from the one or more information processing apparatuses;
obtaining, by a processor, with respect to each of the requests, based on a transmission time of the each request and a reception time of a response to the each request, a processing time in association with an execution of a process by one of the one or more information processing apparatuses according to the each request, the processing time spanning a start to completion of the execution of the process;
compiling, by the processor, in a memory, a concurrent process count and the processing time in association with the each request, the concurrent process count indicating a number of processes being executed by the one information processing apparatus at the start of the execution of the process;
calculating, by the processor, with respect to each concurrent process count, an average value of a subset of processing times each associated with the each concurrent process count;
determining, by the processor, need for an addition to resources of the one or more information processing apparatuses based on a newly compiled processing time and an average value of a concurrent process count associated with the newly compiled processing time; and
transmitting an auto-scaling request for scale-out when the addition to the resources is determined,
wherein the calculating includes:
identifying, amongst concurrent process counts less than an aggregate target concurrent process count whose average value is to be calculated, a largest concurrent process count whose average value has been calculated;
excluding first processing times from aggregate target processing times associated with the aggregate target concurrent process count, the first processing times each being equal to or less than an average value calculated for the largest concurrent process count; and
calculating an average value of second processing times associated with the aggregate target concurrent process, the second processing times being included in the aggregate target processing times and not excluded from the aggregate target processing times by the excluding.

13. A management apparatus comprising:
a memory; and
a processor coupled to the memory and configured to perform a procedure including:
transmitting requests to one or more information processing apparatuses;
receiving responses from the one or more information processing apparatuses;
obtaining, with respect to each of the requests, based on a transmission time of the each request and a reception time of a response to the each request, a processing time in association with an execution of a process by one of the one or more information processing apparatuses according to the each request, the processing time spanning a start to completion of the execution of the process;
compiling, in the memory, a concurrent process count and the processing time in association with the each request, the concurrent process count indicating a number of processes being executed by the one information processing apparatus at the start of the execution of the process;
calculating, with respect to each concurrent process count, an average value of a subset of processing times each associated with the each concurrent process count;
determining need for an addition to resources of the one or more information processing apparatuses based on a newly compiled processing time and an average value of a concurrent process count associated with the newly compiled processing time; and
transmitting an auto-scaling request for scale-out when the addition to the resources is determined,
wherein the calculating includes:
identifying, amongst concurrent process counts less than an aggregate target concurrent process count whose average value is to be calculated, a largest concurrent process count whose average value has been calculated;
excluding first processing times from aggregate target processing times associated with the aggregate target concurrent process count, the first processing times each being equal to or less than an average value calculated for the largest concurrent process count; and
calculating an average value of second processing times associated with the aggregate target concurrent process, the second processing times being included in the aggregate target processing times and not excluded from the aggregate target processing times by the excluding.

* * * * *